(12) United States Patent
Mastopietro et al.

(10) Patent No.: US 11,721,444 B2
(45) Date of Patent: Aug. 8, 2023

(54) METHOD FOR INSTALLING EXTENSION TUBE IN A NUCLEAR REACTOR

(71) Applicant: Westinghouse Electric Company LLC, Cranberry Township, PA (US)

(72) Inventors: Anthony J. Mastopietro, Wauwatosa, WI (US); Eric M. Benacquista, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 219 days.

(21) Appl. No.: 17/375,885

(22) Filed: Jul. 14, 2021

(65) Prior Publication Data
US 2022/0005616 A1  Jan. 6, 2022

Related U.S. Application Data

(62) Division of application No. 16/883,339, filed on May 26, 2020, now Pat. No. 11,380,447.

(51) Int. Cl.
*G21C 13/036* (2006.01)
*G21C 19/20* (2006.01)
(Continued)

(52) U.S. Cl.
CPC ........... *G21C 13/036* (2013.01); *G21C 19/20* (2013.01); *G21C 3/3206* (2013.01); *G21C 3/326* (2013.01); *G21C 7/10* (2013.01)

(58) Field of Classification Search
CPC .... G21C 3/3206; G21C 3/326; G21C 13/032; G21C 13/036; G21C 19/20
(Continued)

(56) References Cited

U.S. PATENT DOCUMENTS 3,941,653 A * 3/1976 Thorp, II ................. G21C 7/12
92/24
4,714,584 A * 12/1987 Altman ..................... G21C 7/12
376/463
(Continued)

FOREIGN PATENT DOCUMENTS

FR      2689297 A1    3/1992
FR      2813700 A1 *  3/2002  .......... G21C 13/036
(Continued)

OTHER PUBLICATIONS

International Search Report and Written Opinion for International PCT Application No. PCT/US2021/033934, dated Oct. 2021.

*Primary Examiner* — Jack W Keith
*Assistant Examiner* — Jinney Kil
(74) *Attorney, Agent, or Firm* — K&L Gates LLP

(57) ABSTRACT

Arrangements and devices for reducing and/or preventing wear of a thermal sleeve in a nuclear reactor are disclosed. Arrangements include a first structure provided on or in one the thermal sleeve and a second structure provided on or in the head penetration adapter. At least a portion of the first structure and at least another portion of the second structure interact to resist, reduce, and/or prevent rotation of the thermal sleeve about its central axis relative to the head penetration adapter. Devices include a base for coupling to a guide tube of the reactor and a plurality of protruding members extending upward from the base. Each member having a portion for engaging a corresponding portion of a guide funnel of the thermal sleeve.

20 Claims, 38 Drawing Sheets

(51) Int. Cl.
    *G21C 3/32*         (2006.01)
    *G21C 3/326*      (2006.01)
    *G21C 7/10*         (2006.01)

(58) Field of Classification Search
    USPC .......................................... 376/204, 235, 353
    See application file for complete search history.

(56) References Cited

U.S. PATENT DOCUMENTS

| | | |
|---|---|---|
| 5,297,187 A | 3/1994 | Sodergren et al. |
| 5,404,382 A | 4/1995 | Russ et al. |
| 5,432,828 A | 7/1995 | Cayment et al. |
| 5,751,778 A | 5/1998 | Magnin |
| 6,345,084 B1 | 2/2002 | Jensen |
| 2007/0140406 A1 | 6/2007 | Mazuy |
| 2011/0170650 A1 | 7/2011 | Wepfer |
| 2013/0089173 A1 | 4/2013 | Wintermann et al. |
| 2019/0013106 A1 | 1/2019 | Blanc et al. |
| 2019/0252082 A1 | 8/2019 | Benacquista et al. |
| 2021/0125739 A1 | 4/2021 | Markham et al. |

FOREIGN PATENT DOCUMENTS

| | | | |
|---|---|---|---|
| TW | 240314 B | 2/1995 | |
| WO | 0055864 A1 | 9/2000 | |
| WO | WO-0055864 A1 * | 9/2000 | ........... G21C 13/028 |

\* cited by examiner

METHOD FOR INSTALLING EXTENSION TUBE IN A NUCLEAR REACTOR

CROSS-REFERENCE TO RELATED APPLICATION

This application is a divisional application claiming priority under 35 U.S.C. § 121 to U.S. patent application Ser. No. 16/883,339, entitled METHOD FOR THERMAL SLEEVE ELIMINATION, filed May 26, 2020, which is incorporated herein by reference in its entirety.

TECHNICAL FIELD

The present disclosure relates generally to methods for eliminating thermal sleeves in a nuclear reactor and, more particularly, to methods for replacing thermal sleeves in a nuclear reactor with extension tubes attached directly to a control rod drive mechanism (CRDM) penetration housing of the nuclear reactor.

BACKGROUND

In a nuclear reactor, thermal sleeves serve four purposes. The thermal sleeve protects the rod cluster control assembly (RCCA) drive rod from the fluid effects present in the reactor vessel head plenum (e.g., cross flow). The thermal sleeve facilitates hydraulic communication (flow to the CRDM) during RCCA insertion (control rod drop). The thermal sleeve provides alignment to the control drive rod for vessel head installation. The thermal sleeve also protects the head penetration and CRDM housing from thermal transients of the reactor coolant.

Thermal sleeves include an outside diameter (OD) and an inside diameter (ID) and include flanges. Thermal sleeves are subject to wear at the flanges and the OD/ID. It has been observed that thermal sleeves are subject to wear between the upper head and the CRDM penetration housing in a nuclear reactor. This wear has been measured using laser metrology to determine the amount that a particular thermal sleeve has "dropped."

Thermal sleeve flange and OD/ID wear results in recurring maintenance costs. Thermal sleeve failure due to OD/ID wear requires costly repair before a return to power is possible. Wear predictions through Pressurized Water Reactor Owners Group (PWROG) programs can be used to identify which sleeves will need eventual intervention. Proactive elimination of the thermal sleeves can eliminate or greatly delay future thermal sleeve inspections for any type of wear.

A method for removing a worn thermal sleeve and replacing it with a temporary "compressible thermal sleeve" has been developed. The method does not require removal of the CRDM motor assembly from the top side of the reactor head. The method, however, does not address the failure mechanism due to thermal sleeve wear and CRDM penetration housing. Thus, even a compressible thermal sleeve will most likely continue to wear along with the CRDM penetration housing.

In response to operational experience of thermal sleeve wear at a number of nuclear plants there is a clear need for eliminating thermal sleeves used in nuclear reactors. Thermal sleeve flange and/or ID/OD wear have been identified during inspection of nuclear reactors. Moreover, there is a need for replacing the thermal sleeves with extension tubes attached directly to the CRDM penetration housing of the nuclear reactor. Accordingly, there is a strong and repeated need for permanent thermal sleeve replacement to remove the need for multiple, varied thermal sleeve inspections over time.

SUMMARY

In one aspect, the present disclosure provides a method for installing an extension tube in a nuclear reactor comprising a control rod drive mechanism (CRDM) housing with a threaded head penetration nozzle and a thermal sleeve disposed therein. The method comprises removing the thermal sleeve from the threaded head penetration nozzle and aligning an extension tube with the threaded end of the head penetration nozzle. The extension tube comprises a threaded end and non-threaded end, the threaded end sized and configured to threadably couple to the threaded head penetration nozzle. The method further comprises threading the threaded end of the extension tube to the threaded end of the threaded head penetration nozzle, torqueing the extension tube to the threaded end of the threaded head penetration nozzle, gauging the alignment of the extension tube relative to the threaded head penetration nozzle, installing retention fillet welds between the extension tube and the threaded end of the threaded head penetration nozzle, and installing a guide funnel to the non-threaded end of the extension tube.

In one aspect, the present disclosure provides a method for installing an extension tube in a nuclear reactor comprising a control rod drive mechanism (CRDM) housing with a non-threaded head penetration nozzle and a thermal sleeve disposed therein. The method comprises machining the non-threaded CRDM housing, installing and aligning a threaded adapter to the machined end of the non-threaded CRDM housing, joining the threaded adapter to the machined end of the non-threaded CRDM housing, machining a bore defined by the non-threaded CRDM housing, machining a bore defined by the threaded adapter, machining an outside diameter of the joint between the machined end of the non-threaded CRDM housing and the threaded adapter, installing an extension tube to the threaded adapter, and installing retention fillets welds between the extension tube and the threaded adapter.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

In one or more various aspects, related systems include but are not limited to circuitry and/or programming for effecting herein-referenced method aspects; the circuitry and/or programming can be virtually any combination of hardware, software, and/or firmware configured to affect the herein-referenced method aspects depending upon the design choices of the system designer. In addition to the foregoing, various other method and/or system aspects are set forth and described in the teachings such as text (e.g., claims and/or detailed description) and/or drawings of the present disclosure.

Further, it is understood that any one or more of the following-described forms, expressions of forms, examples, can be combined with any one or more of the other following-described forms, expressions of forms, and examples.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the described forms are set forth with particularity in the appended claims. The described forms, however, both as to organization and methods of operation, may be best understood by reference to the following description, taken in conjunction with the accompanying drawings in which:

Figure 5:
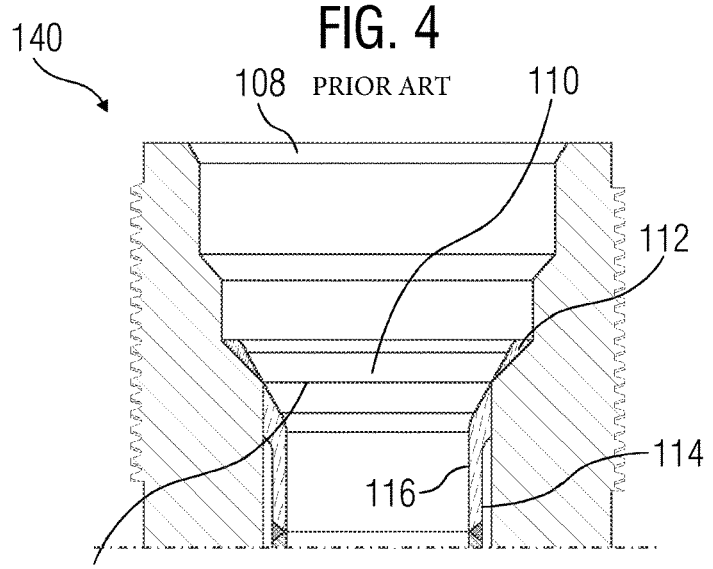

FIG. 5 a section view of a thermal sleeve and CDRM housing in a worn condition to the point of thermal sleeve separation, according to at least one aspect of the present disclosure.

Figure 6:
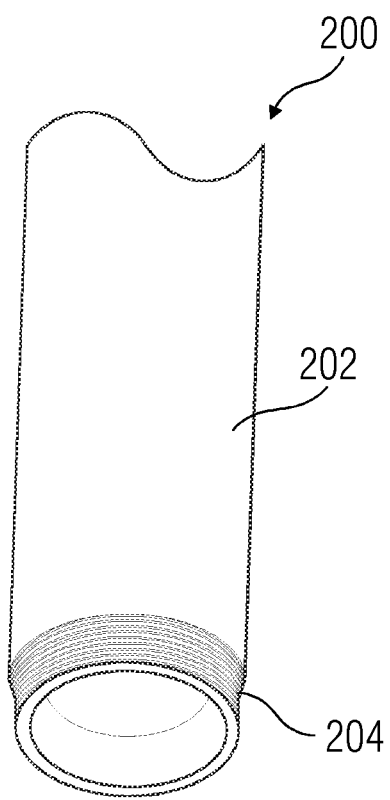

FIG. 6 illustrate an extension tube that can be installed in a nuclear reactor in place of thermal sleeves, according to at least one aspect of the present disclosure.

Figure 7:
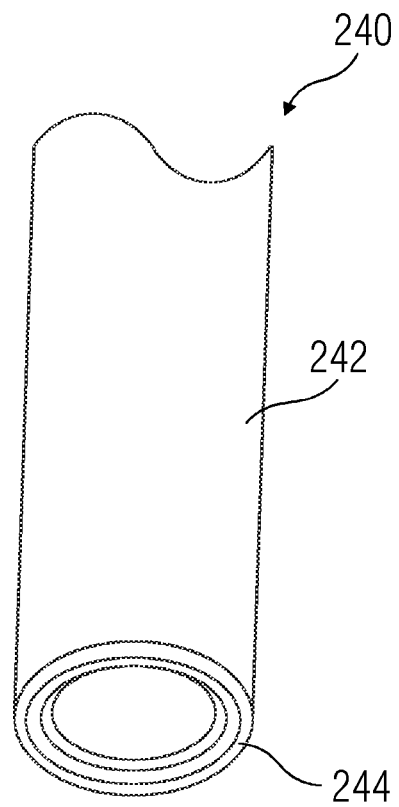

FIG. 7 illustrates an extension tube that can be installed in the nuclear reactor in place of thermal sleeves, according to at least one aspect of the present disclosure.

Figure 8:
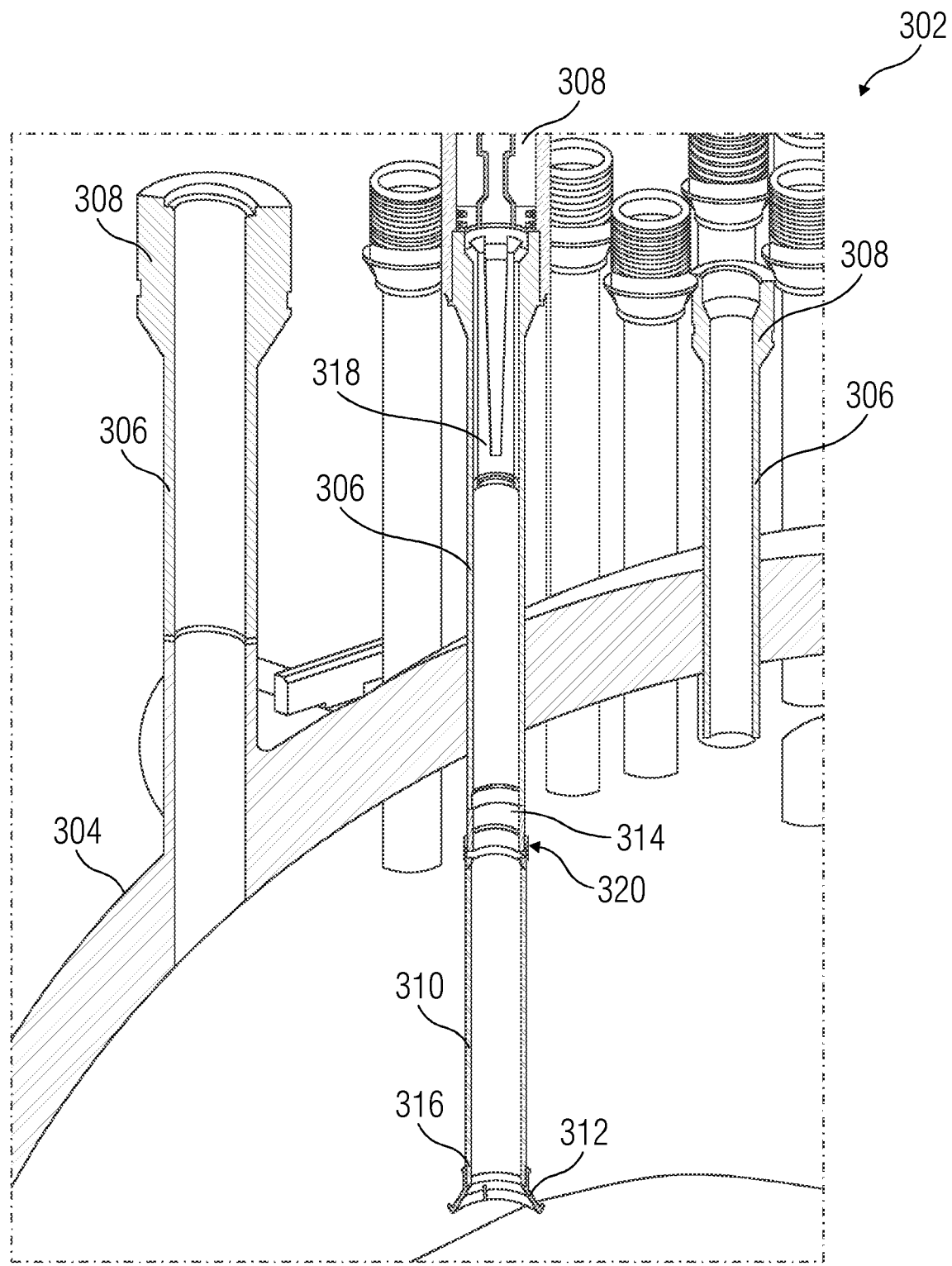

FIG. 8 is a schematic cross-sectional view of an upper portion of a conventional nuclear reactor illustrating a portion of a reactor vessel head penetrated by a plurality of head penetration nozzles which extend downward from a CRDM housing, according to at least one aspect of the present disclosure.

Figure 9:
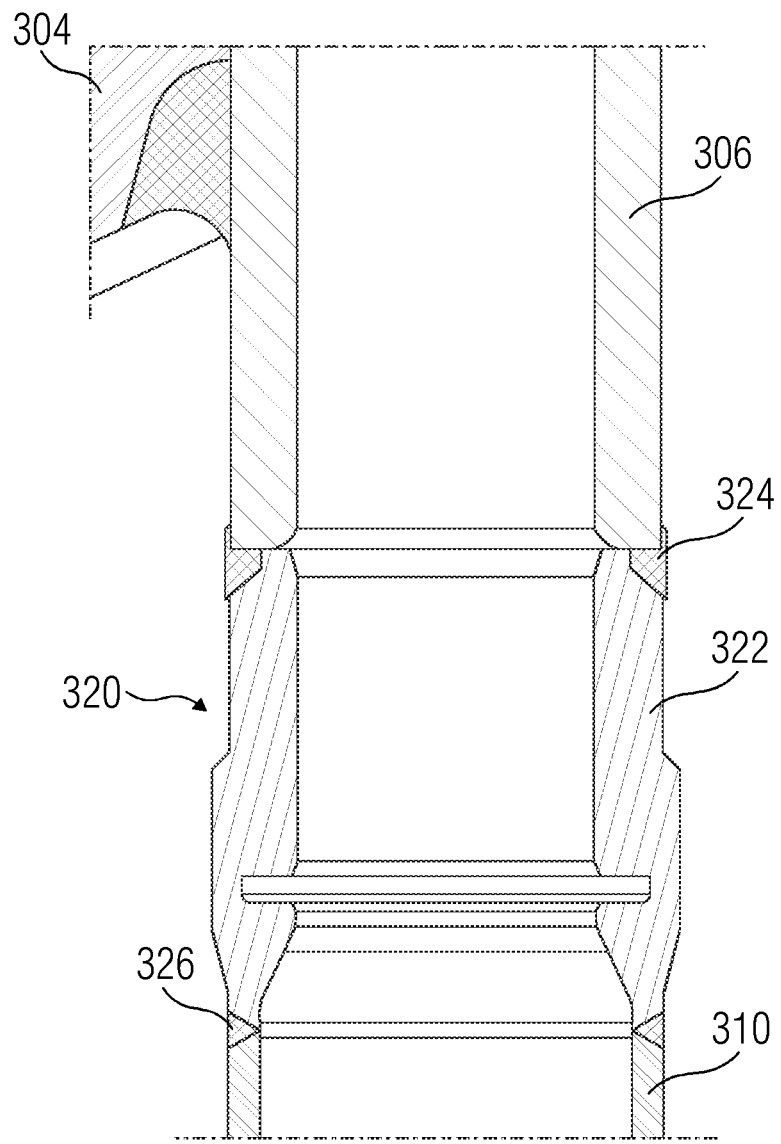

FIG. 9 is a section view of the threaded penetration adapter shown in FIG. 8 coupled between the extension tube and the head penetration nozzle, according to at least one aspect of the present disclosure.

Figure 10:
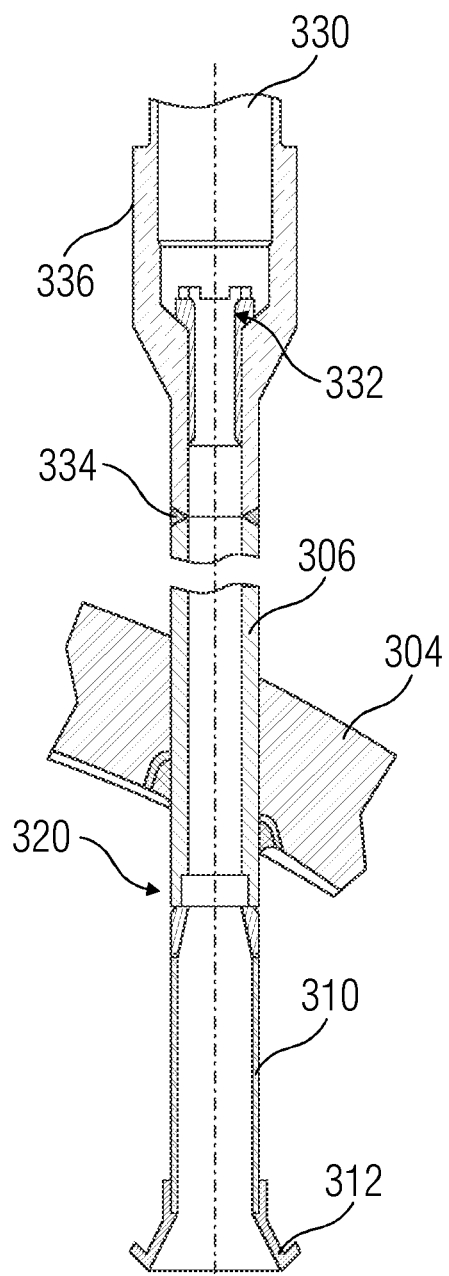

FIG. 10 is a section view of a head penetration nozzle with the extension tube, according to at least one aspect of the present disclosure.

Figure 11:
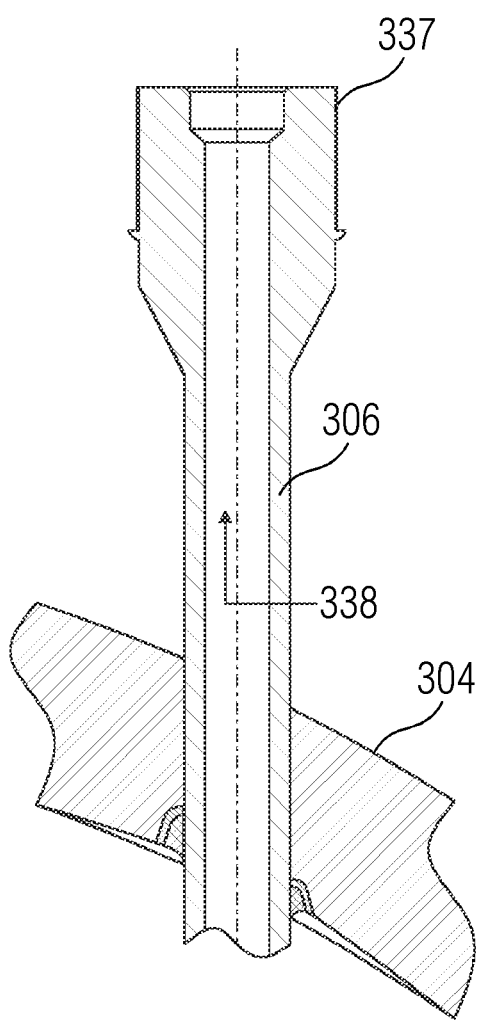

FIG. 11 is a section view of the head penetration nozzle shown in FIG. 10 located through the reactor vessel head, according to at least one aspect of the present disclosure.

Figure 12:
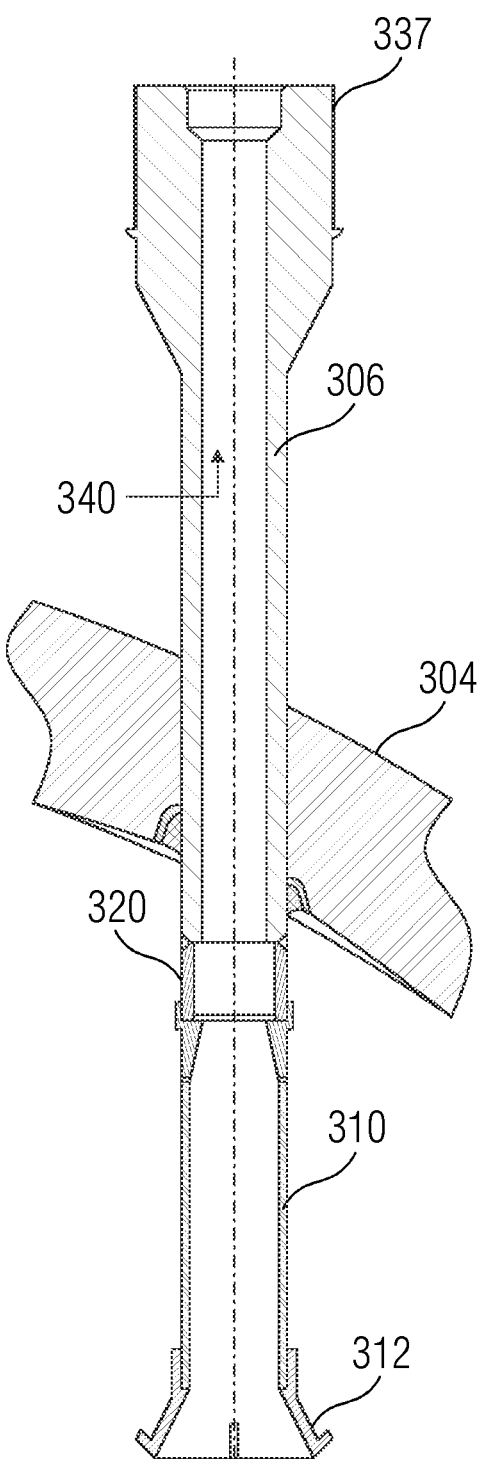

FIG. 12 is a section view of the head penetration nozzle shown in FIGS. 10 and 11 with an extension tube attached thereto, according to at least one aspect of the present disclosure.

Figure 13:
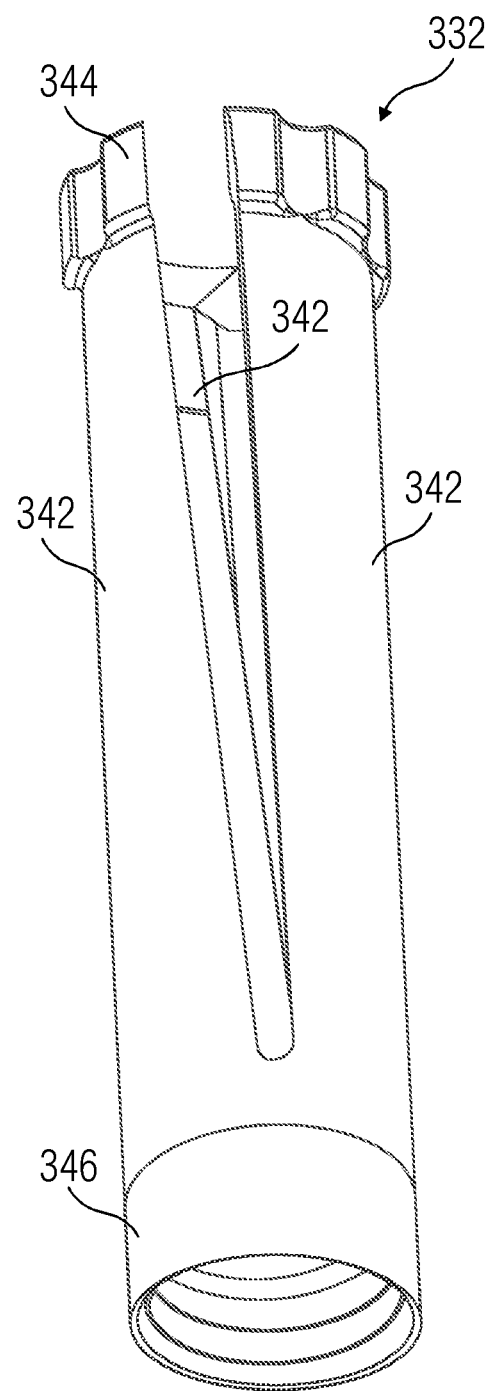

FIG. 13 is a perspective view of a compressible guide sleeve, which is received in the space defined by the head penetration nozzle shown in FIG. 12, according to at least one aspect of the present disclosure.

Figure 14:
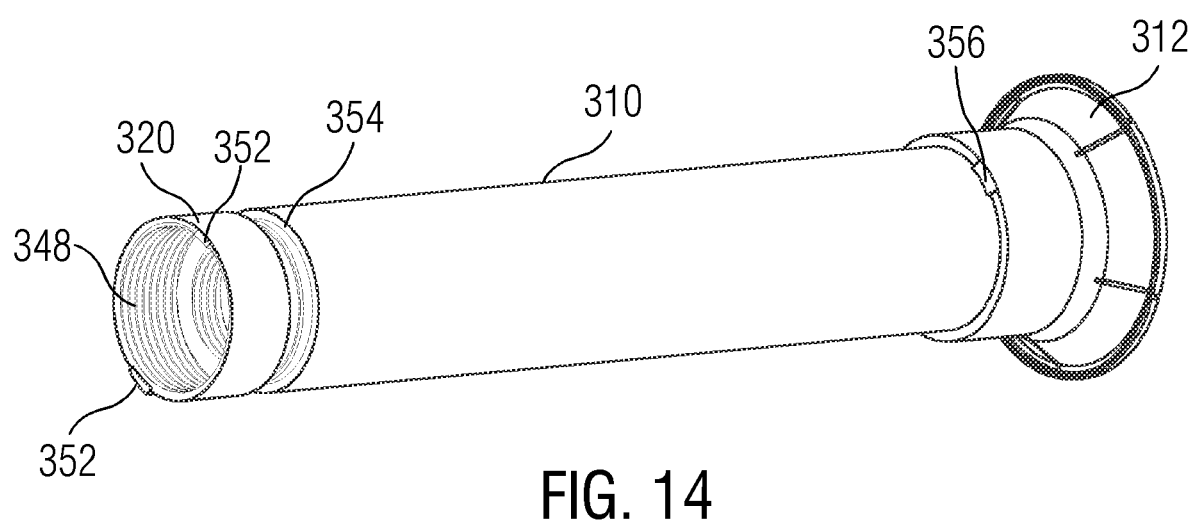

FIG. 14 illustrates an extension tube shown in FIGS. 8-10 and 12 with a guide funnel and a threaded penetration adapter, according to at least one aspect of the present disclosure.

Figure 3:
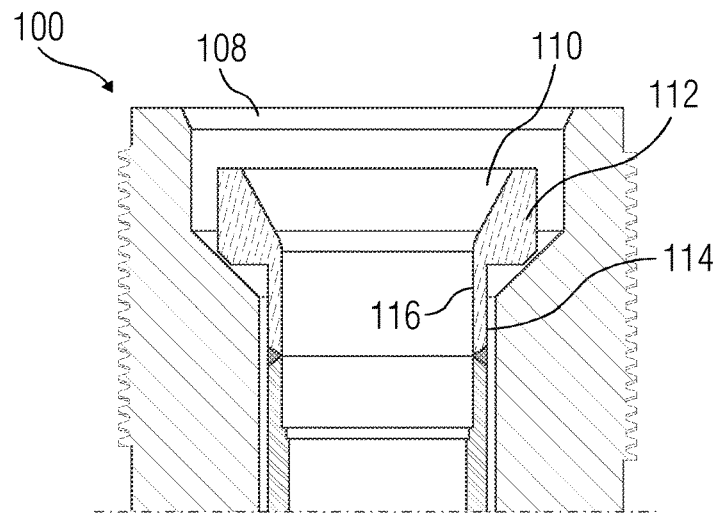
FIG. 3 is a section view of a thermal sleeve and CDRM housing in an un-worn condition, according to at least one aspect of the present disclosure.
Figure 4:
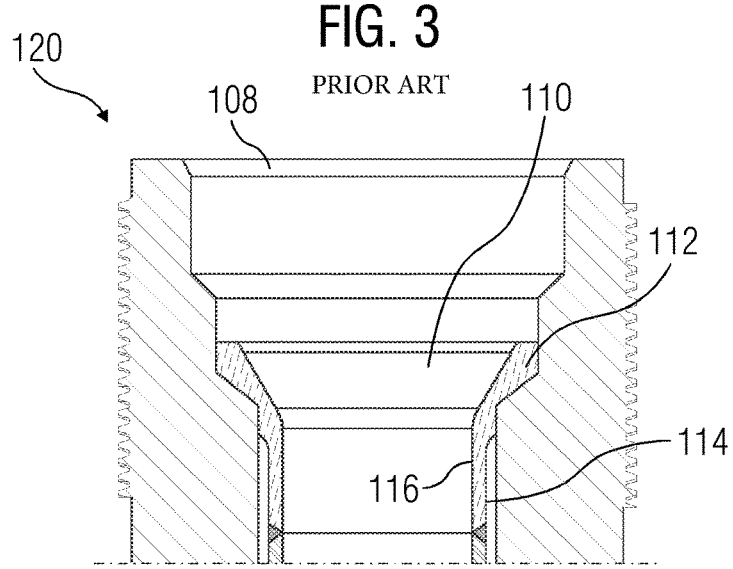
FIG. 4 is a section view of a thermal sleeve and CDRM housing in a substantially worn condition, according to at least one aspect of the present disclosure.
Figure 15:
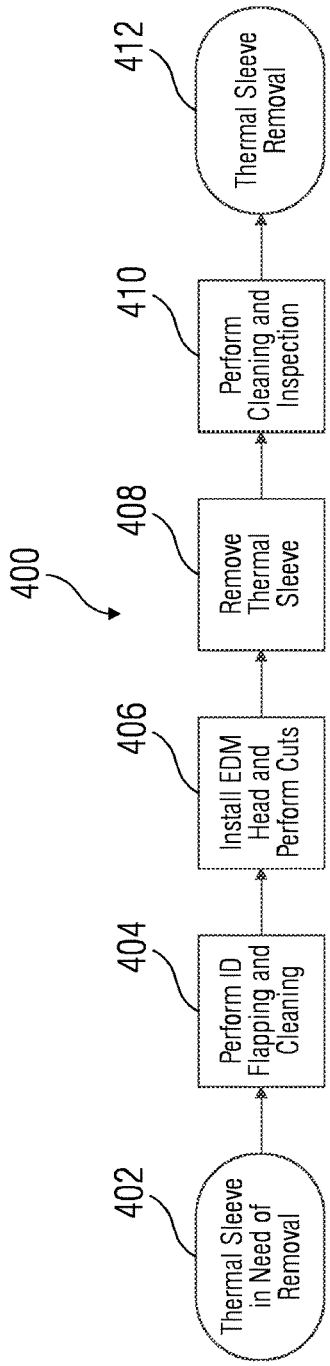

FIG. 15 is a process for removing a thermal sleeve shown in FIGS. 3-5 that are need of removal, according to at least one aspect of the present disclosure.

Figure 16:
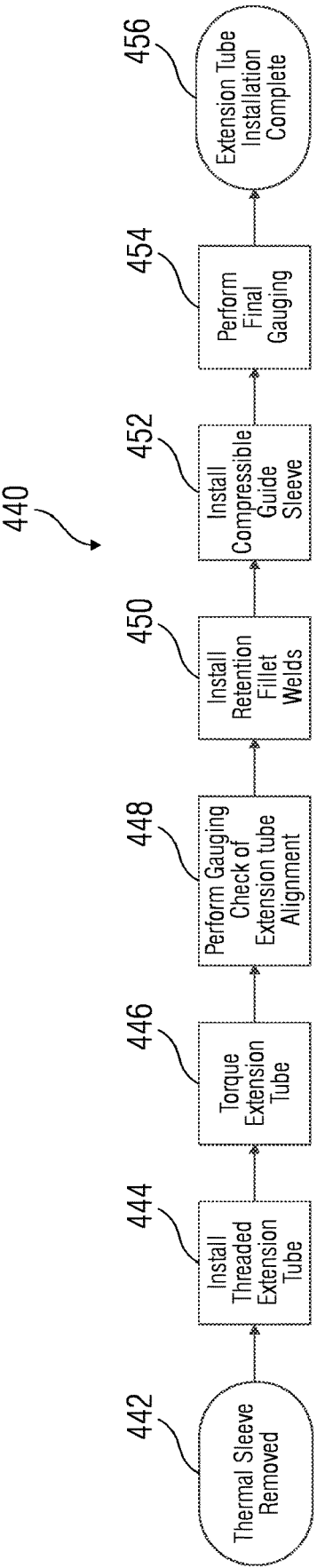

FIG. 16 is a process for installing a threaded extension tube, according to at least one aspect of the present disclosure.

Figure 17:
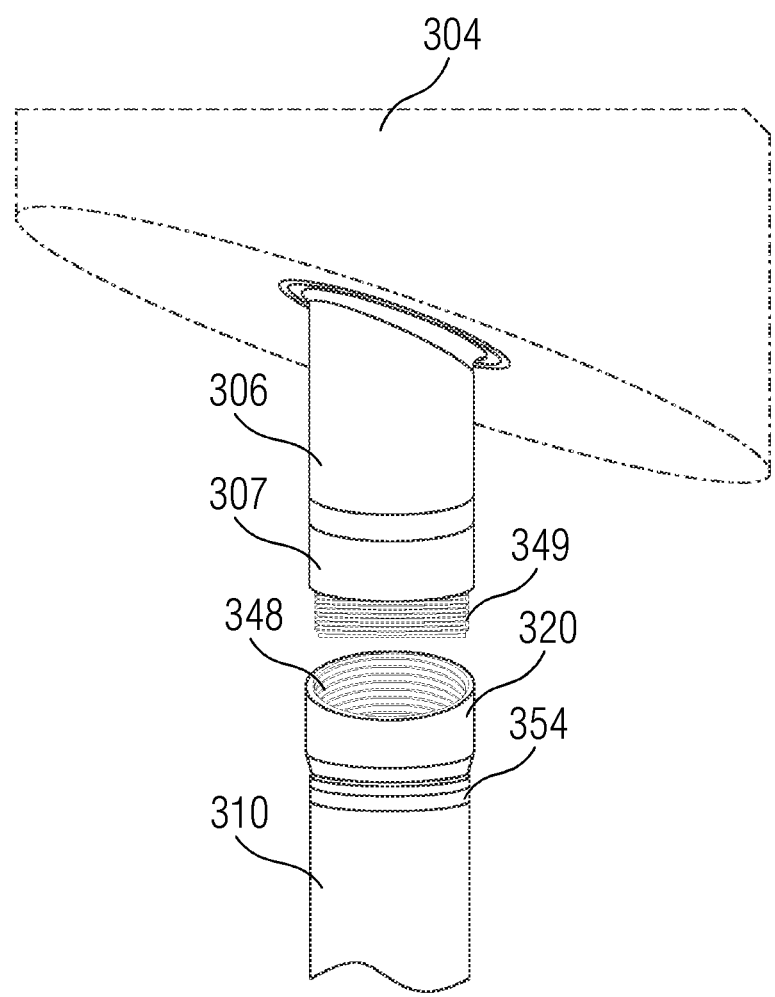

FIG. 17 illustrates an extension tube comprising a threaded penetration adapter aligned with a threaded head penetration nozzle extending through a reactor vessel head, according to at least one aspect of the present disclosure.

Figure 18:
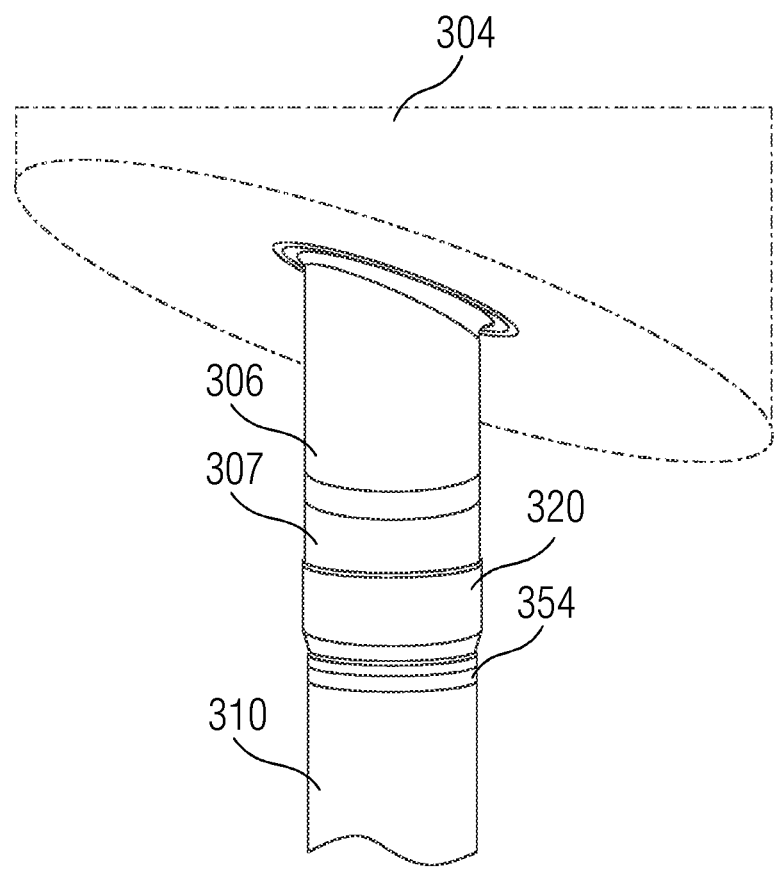

FIG. 18 illustrates the extension tube and threaded head penetration nozzle shown in FIG. 17 threadably coupled, according to at least one aspect of the present disclosure.

Figure 19:
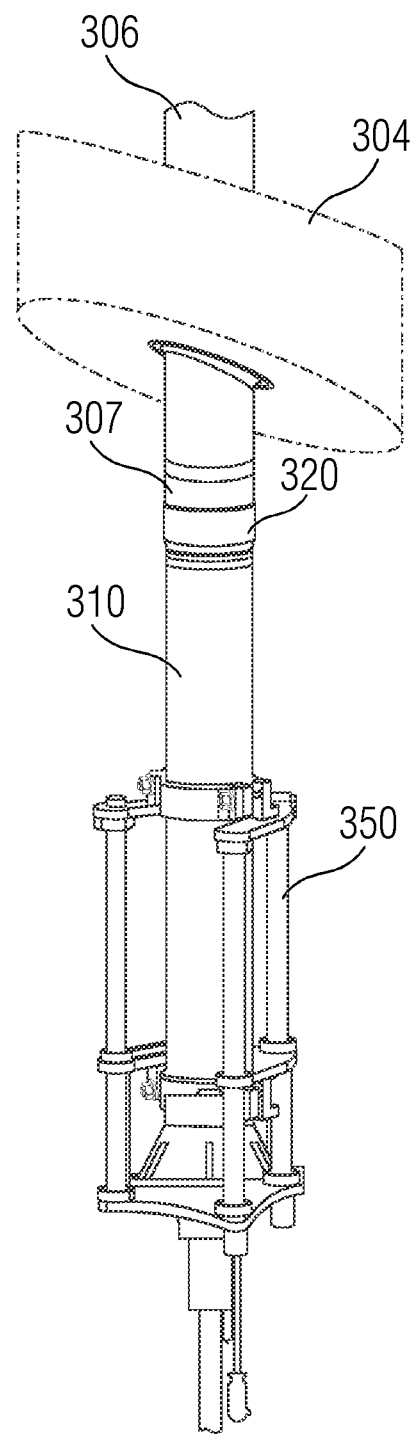

FIG. 19 illustrates torqueing the extension tube to the head penetration nozzle shown in FIG. 18 using a torque tool, according to at least one aspect of the present disclosure.

Figure 20:
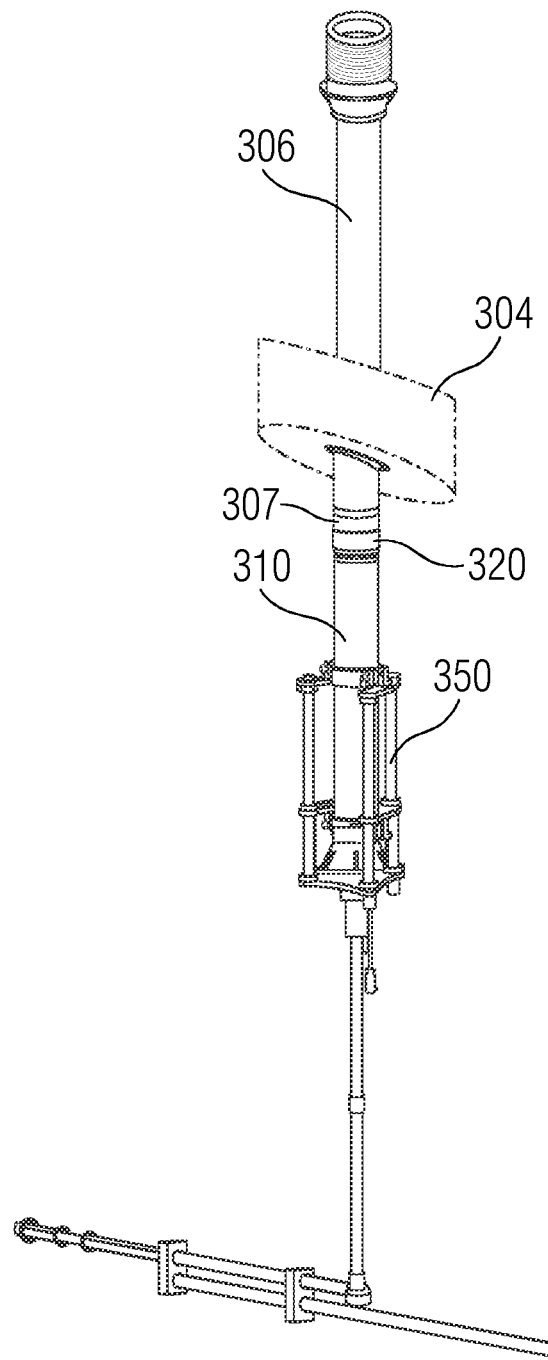

FIG. 20 illustrates torqueing the extension tube to the head penetration nozzle shown in FIG. 18 using a torque tool, according to at least one aspect of the present disclosure.

Figure 21:
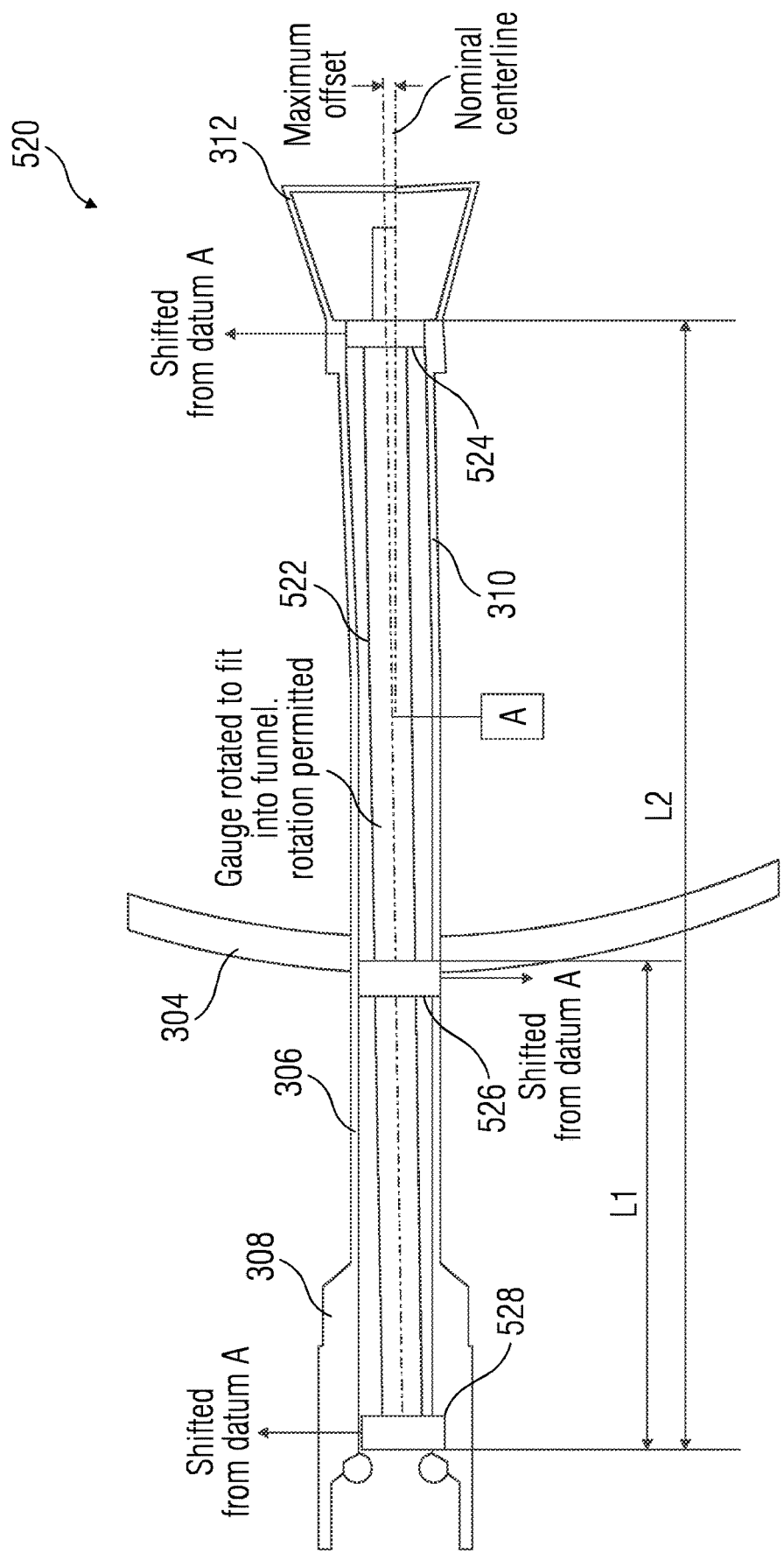

FIG. 21 is a section view of an extension tube alignment gauging test setup, according to at least one aspect of the present disclosure.

Figure 22:
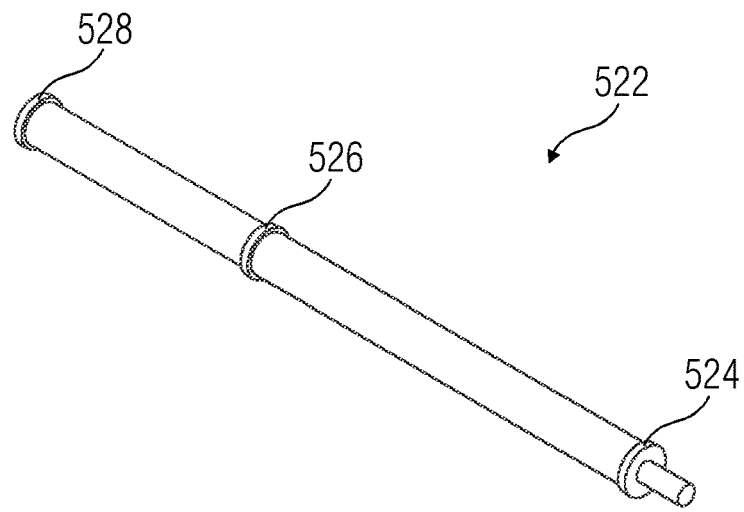

FIG. 22 is a perspective view of a gauge used in the gauging process of the extension tube alignment gauging test setup shown in FIG. 21, according to at least one aspect of the present disclosure.

Figure 23:
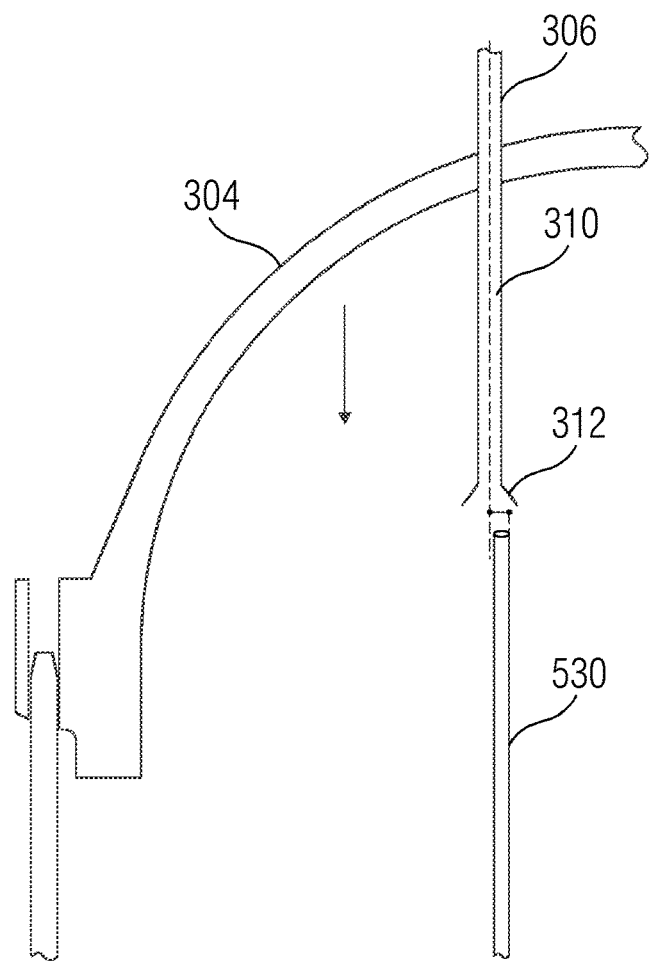

FIG. 23 is a section view of the alignment of a drive rod relative to the extension tube, according to at least one aspect of the present disclosure.

Figure 24:
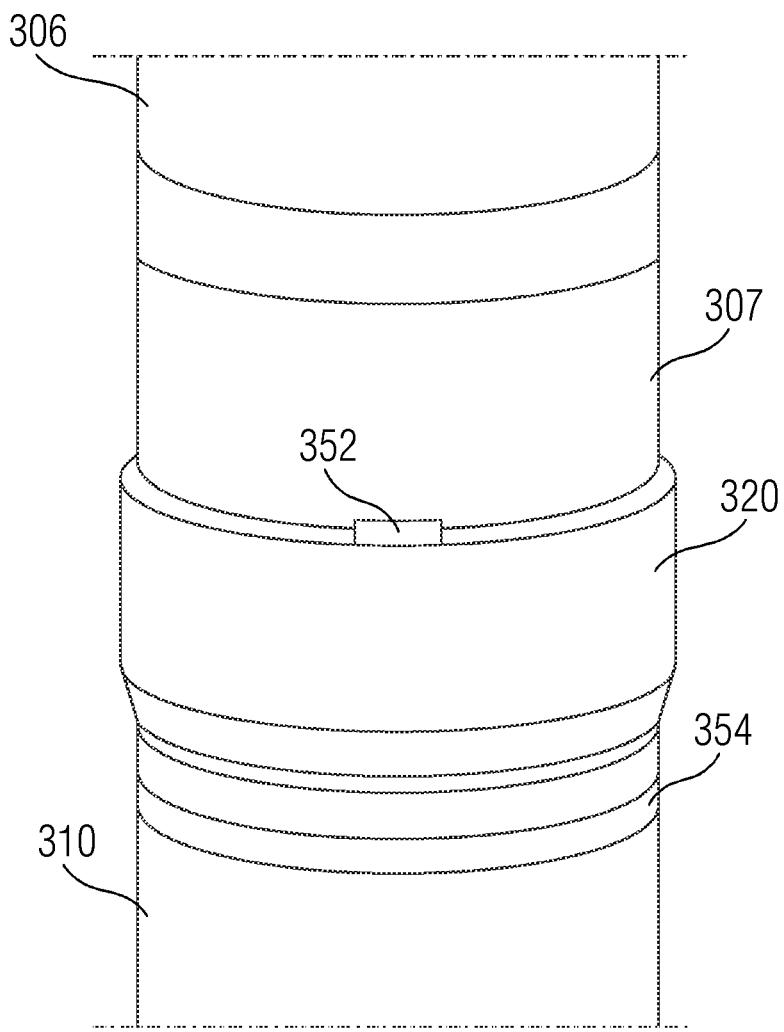

FIG. 24 illustrates retention fillet welds installed between the threaded end of the head penetration nozzle shown in FIG. 18 and the threaded penetration adapter coupled to the extension tube by a weld shown in FIG. 18, according to at least one aspect of the present disclosure.

Figure 25:
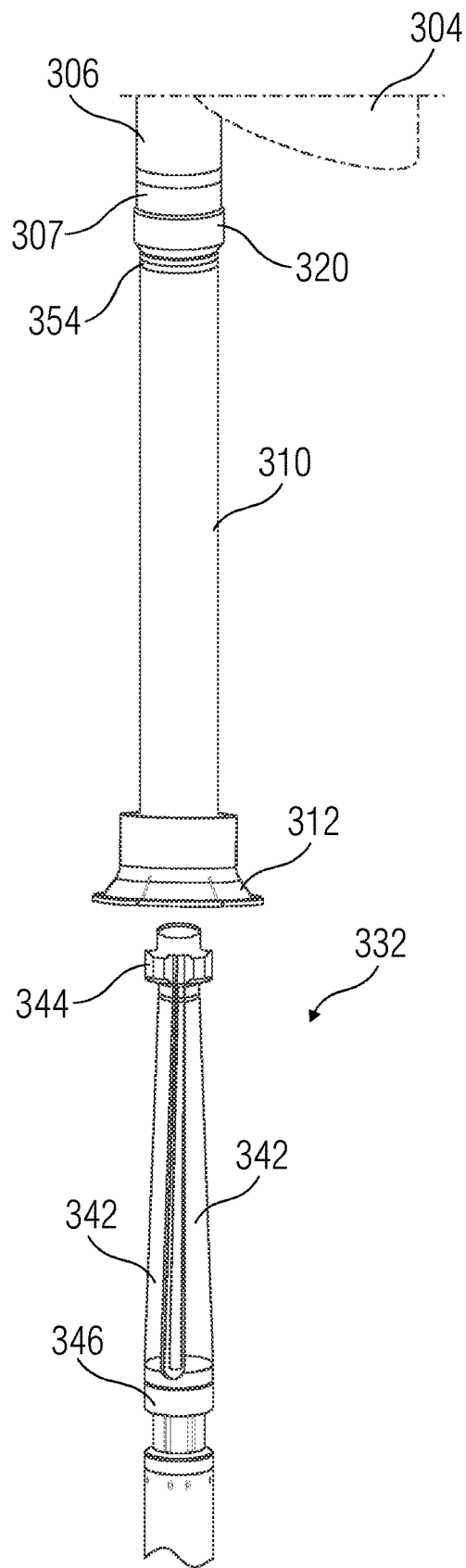

FIG. 25 illustrates a three-leaf compressible flex sections of the compressible guide sleeve shown in FIG. 13 in a compressed configuration to contract flanges of the compressible flex sections to a size suitable for introducing into the guide funnel, according to at least one aspect of the present disclosure.

Figure 26:
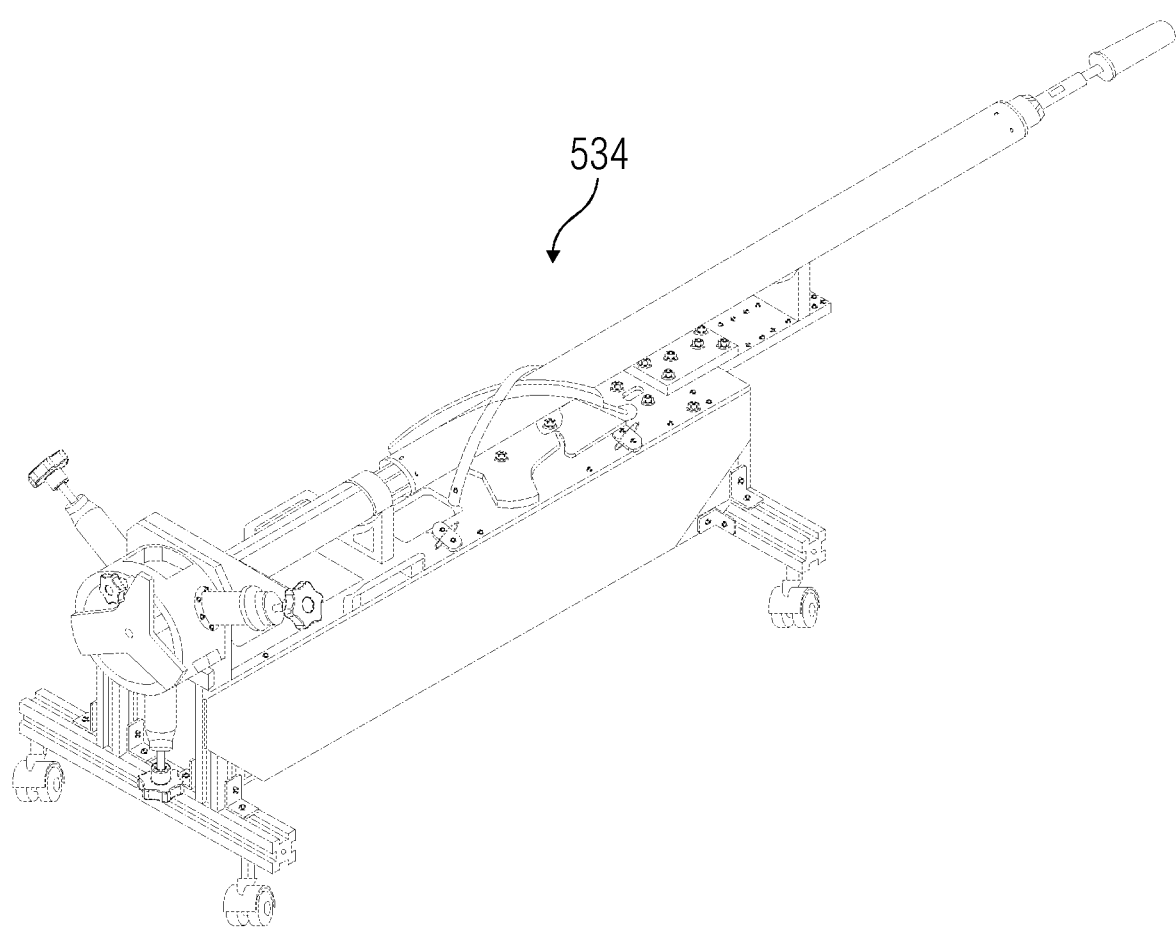

FIG. 26 illustrates a compression tool that may be employed to compress the compressible guide sleeve shown in FIG. 25 prior to inserting the compressible guide sleeve into the guide nozzle, according to at least one aspect of the present disclosure.

Figure 27:
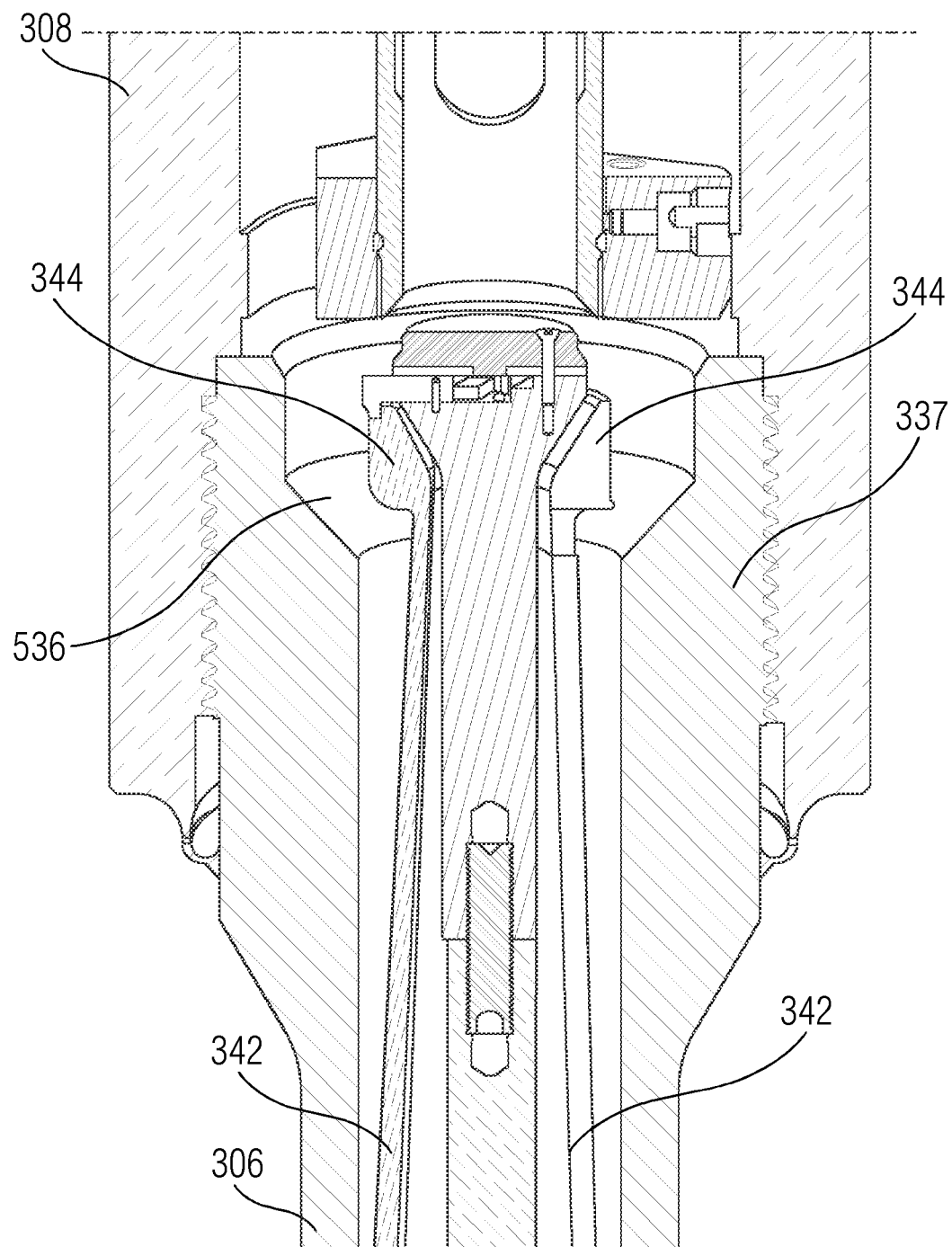

FIG. 27 illustrates the compressible guide sleeve shown in FIG. 25 in its compressed configuration inserted through the head penetration nozzle and the CRDM head adapter, according to at least one aspect of the present disclosure.

Figure 28:
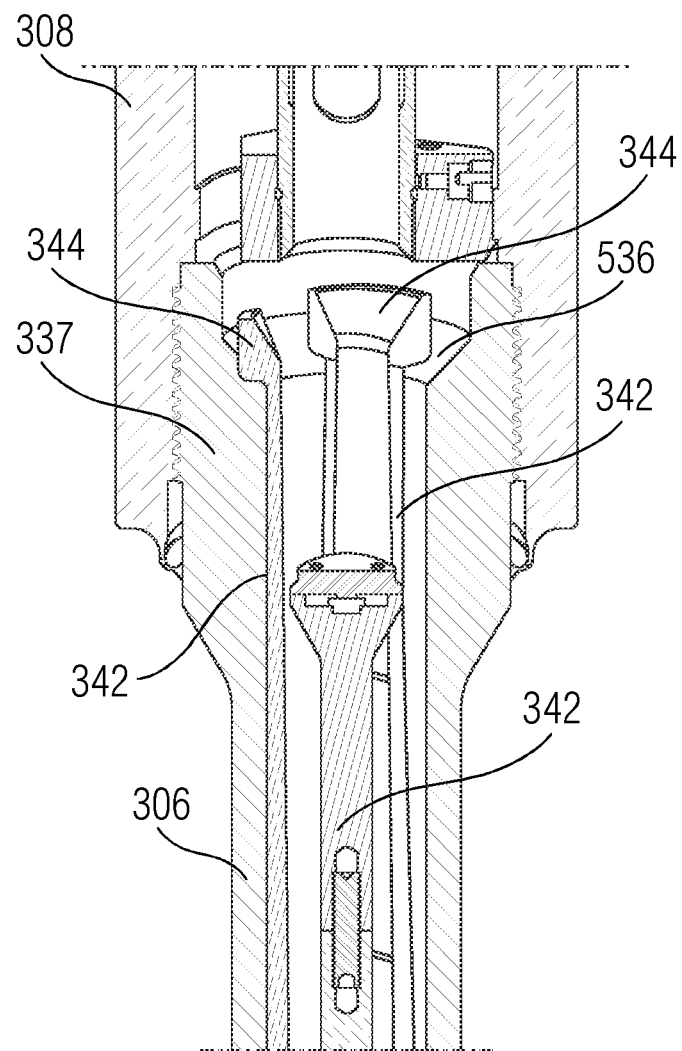

FIG. 28 illustrates the compressible flex sections of the compressible guide sleeve shown in FIG. 27 released such that the flanges of the compressible flex sections engage the counterbore ledge defined within the CRDM head adapter section of the head penetration nozzle, according to at least one aspect of the present disclosure.

Figure 29:
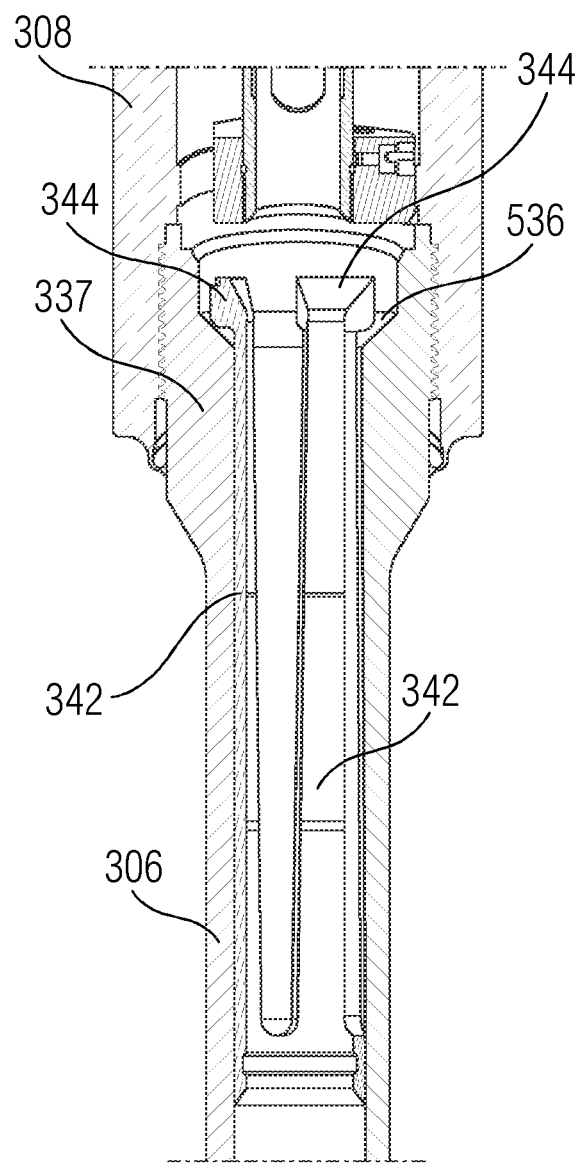

FIG. 29 illustrates the compressible guide sleeve shown in FIG. 28 in its final installed state, according to at least one aspect of the present disclosure.

Figure 30:
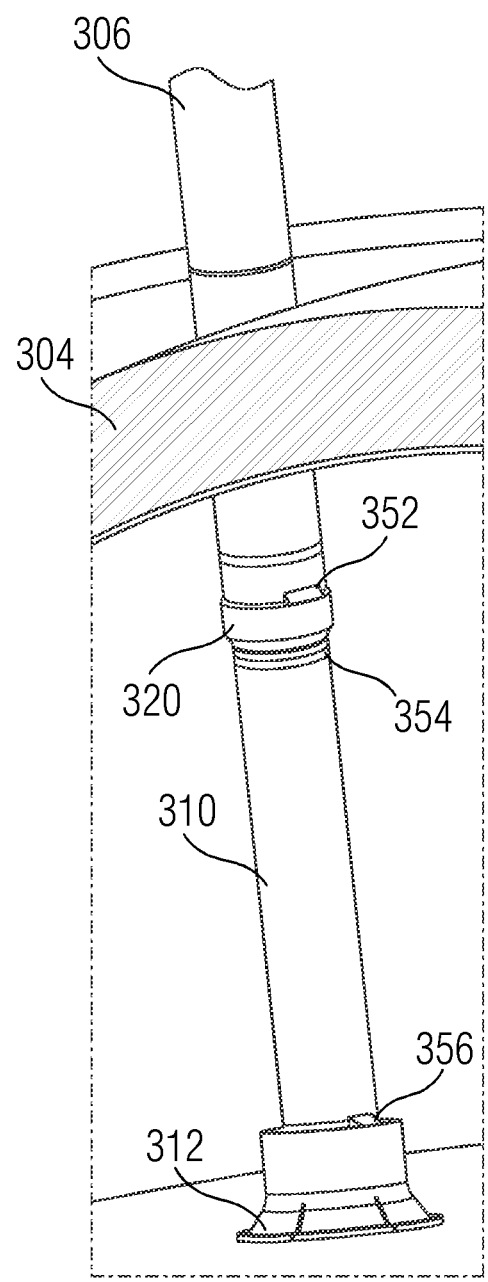

FIG. 30 is a section view of the reactor vessel head illustrating the extension tube coupled to the head penetration nozzle installed inside the reactor vessel head, according to at least one aspect of the present disclosure.

Figure 31:
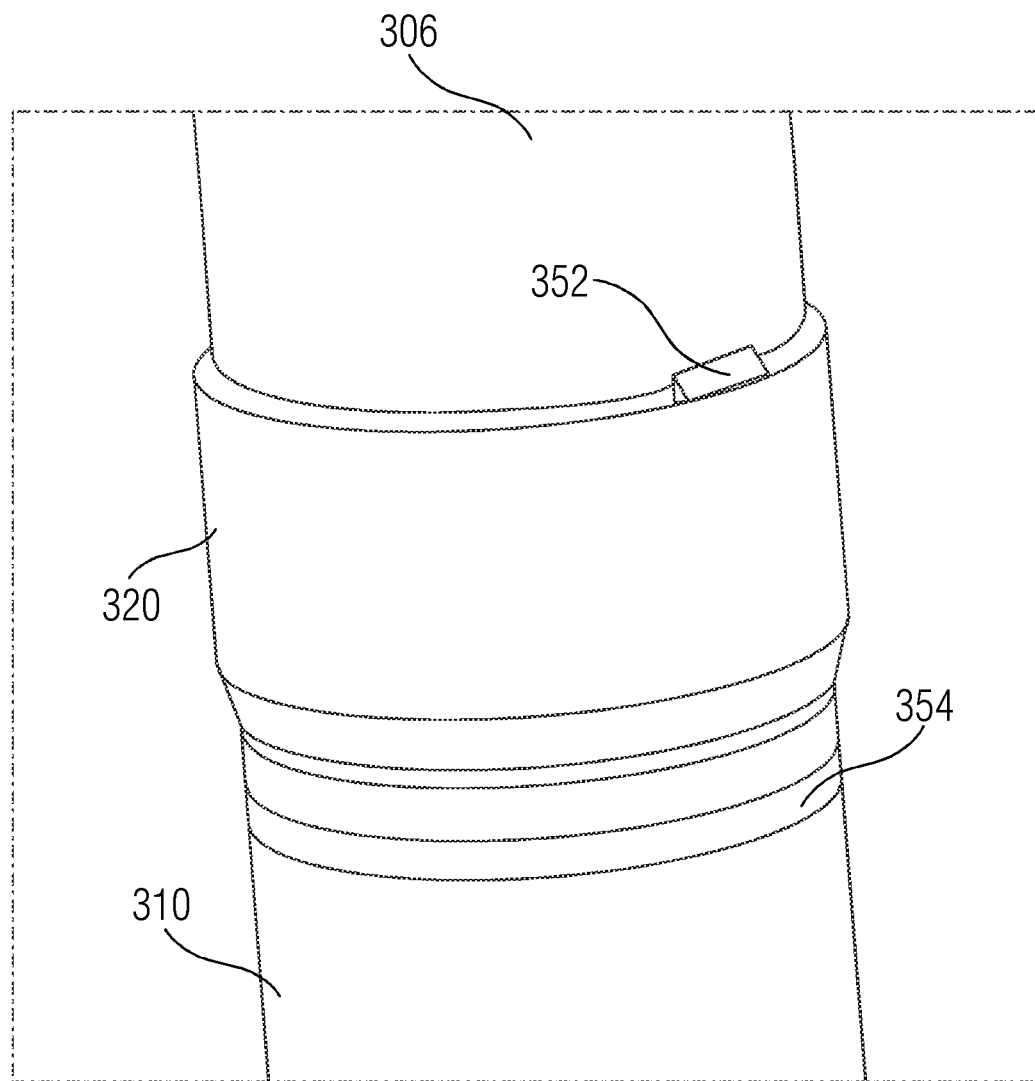

FIG. 31 is a detailed view of the installed extension tube coupled to the head penetration nozzle shown in FIG. 30 showing the extension tube retention welds, according to at least one aspect of the present disclosure.

Figure 32:
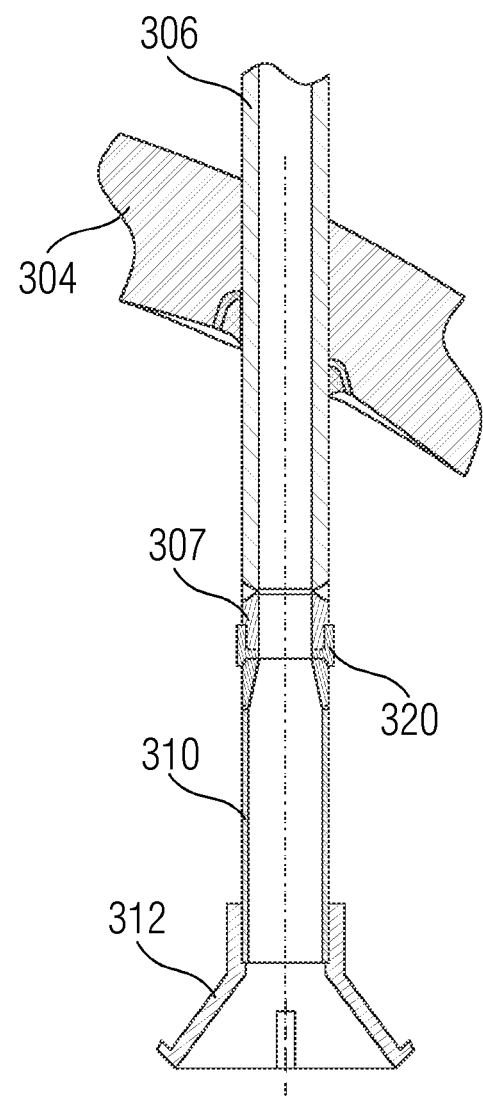

FIG. 32 is a section view of the extension tube coupled to the head penetration nozzle installed inside the reactor vessel head shown in FIG. 31, according to at least one aspect of the present disclosure.

Figure 33:
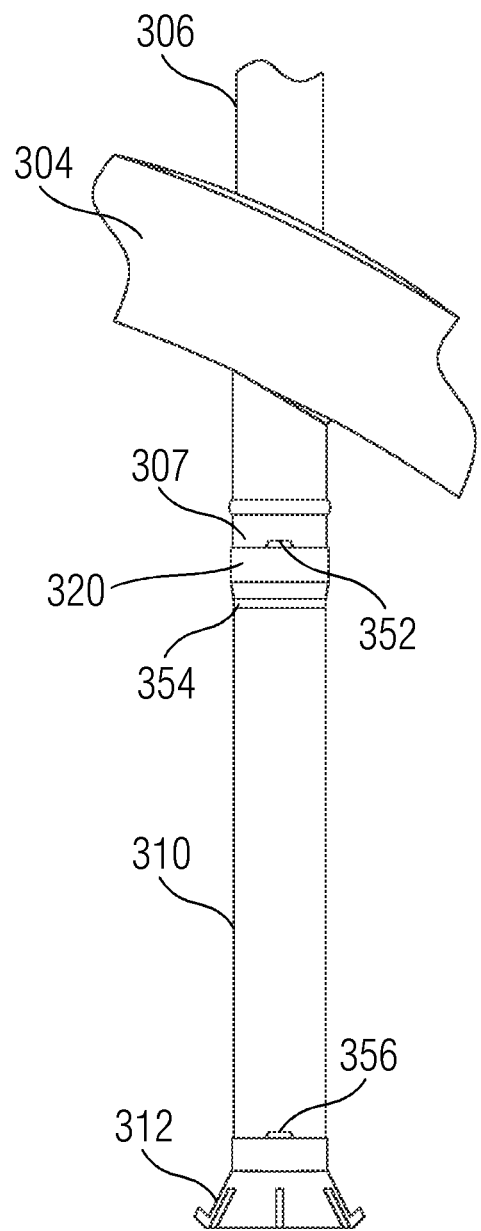

FIG. 33 is an elevation view of the extension tube coupled to the head penetration nozzle installed inside the reactor vessel head shown in FIG. 32, according to at least one aspect of the present disclosure.

Figure 34:
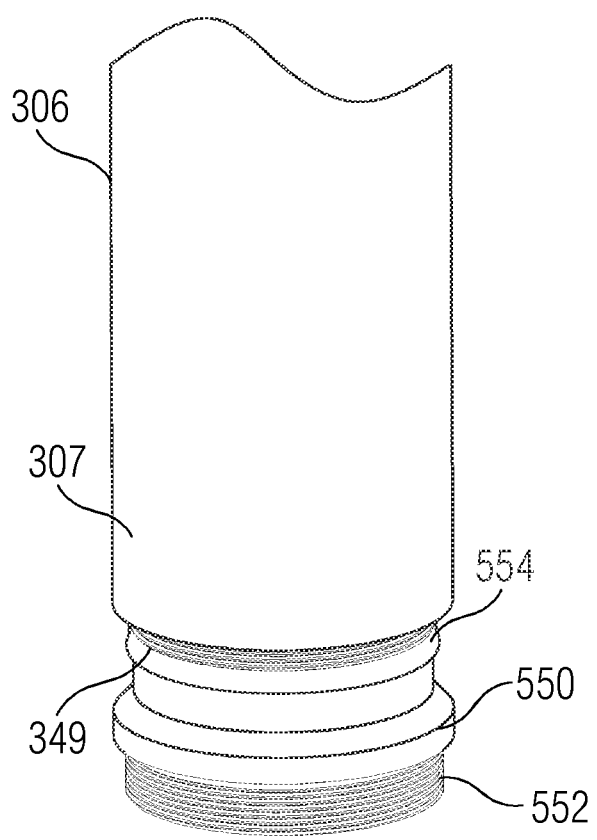

FIG. 34 illustrates a head penetration nozzle with threads that are not usable, due to wear, damage, or sizing mismatch, according to at least one aspect of the present disclosure.

Figure 35:
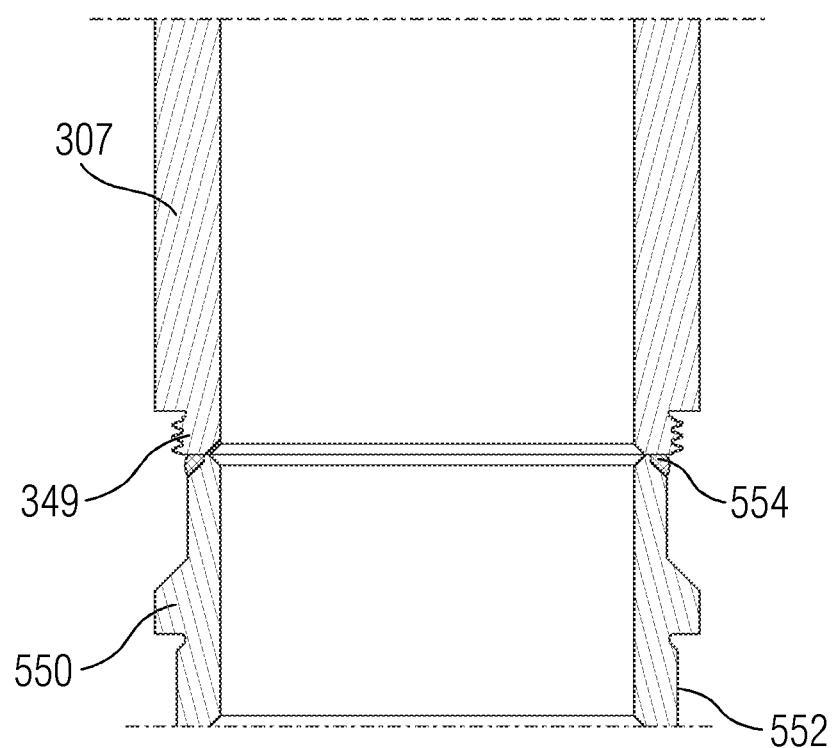

FIG. 35 is a section view of the head penetration nozzle shown in FIG. 34, according to at least one aspect of the present disclosure.

Figure 36:
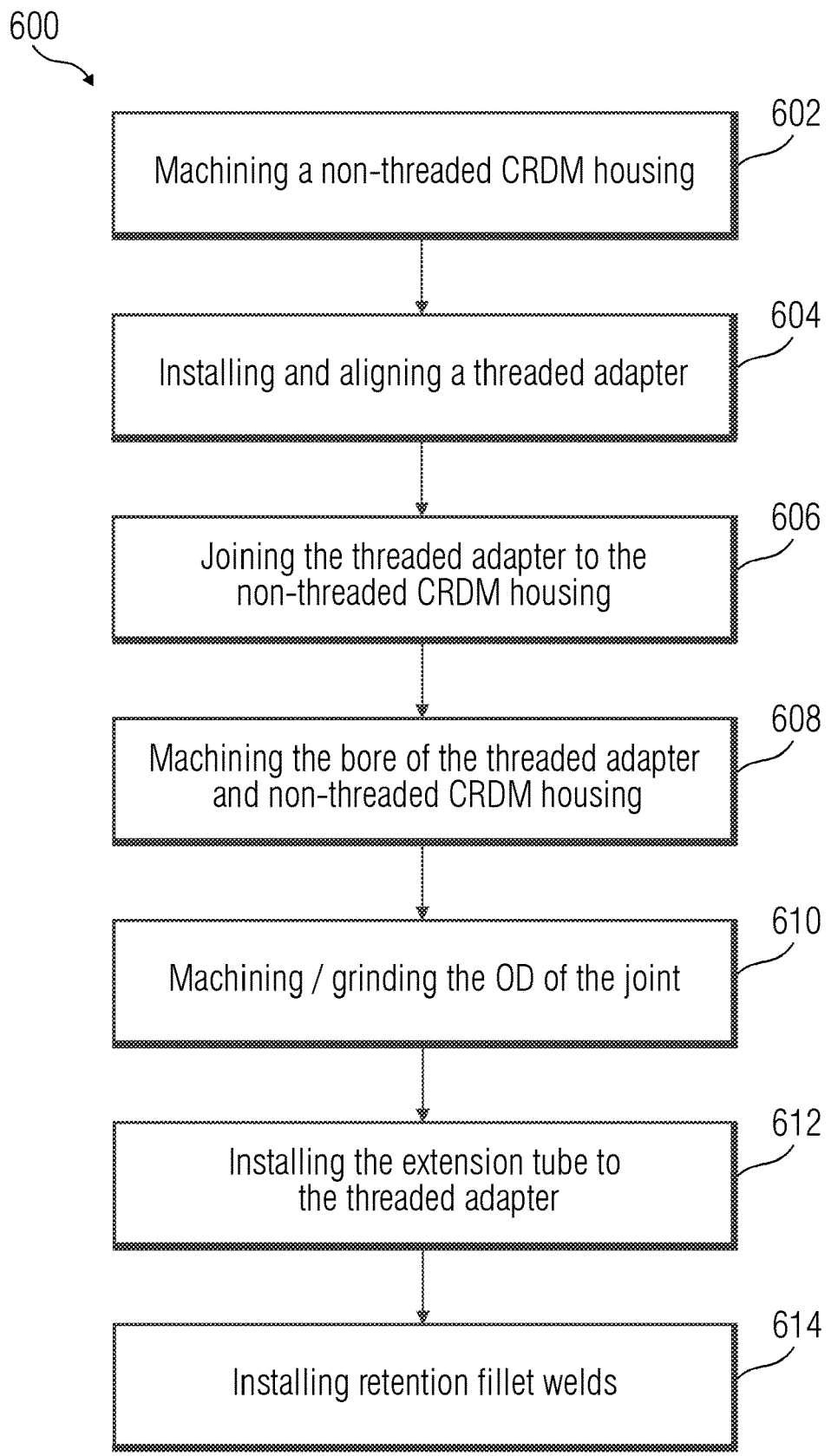

FIG. 36 is a process for installing an extension tube on a non-threaded CRDM housings, according to at least one aspect of the present disclosure.

Figure 37:
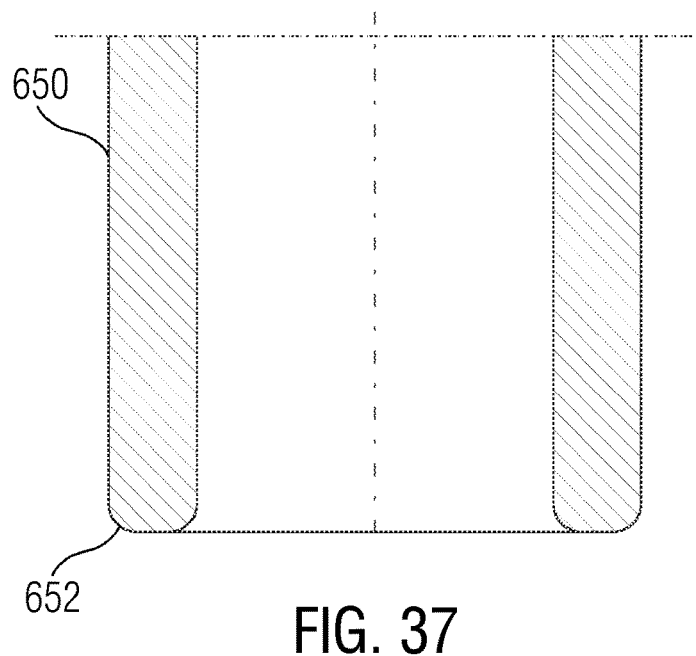

FIG. 37 is a section view of a non-threaded CRDM housing before machining, according to at least one aspect of the present disclosure.

Figure 38:
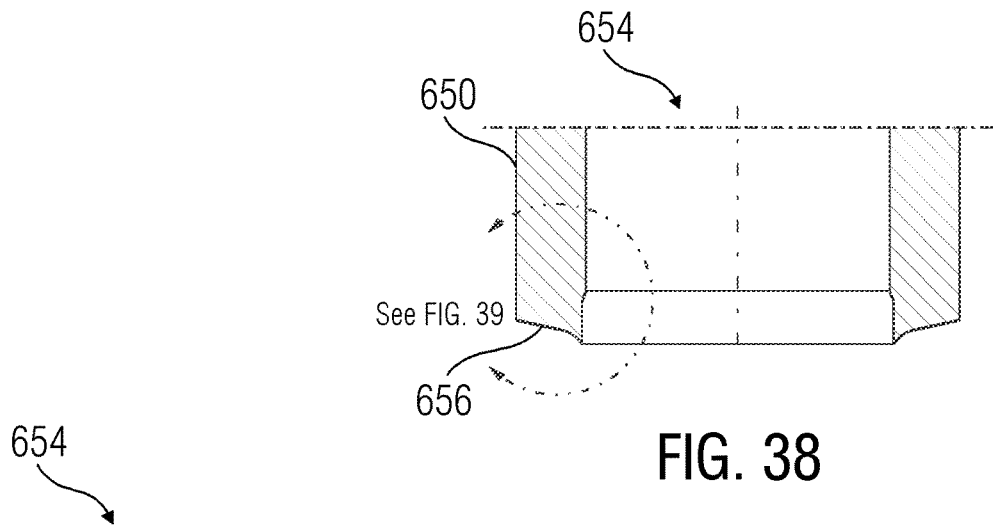

FIG. 38 is a section view of the non-threaded CRDM housing shown inf FIG. 37 after machining, according to at least one aspect of the present disclosure.

Figure 39:
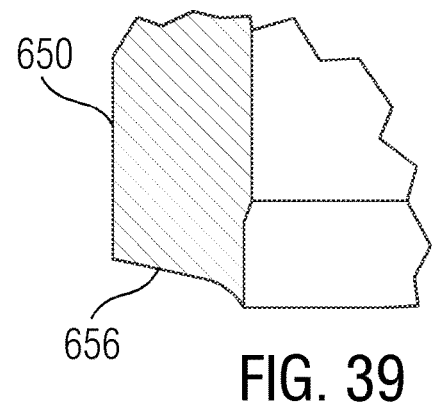

FIG. 39 is a detail view of the section view of the non-threaded CRDM housing shown in FIG. 38, according to at least one aspect of the present disclosure.

Figure 40:
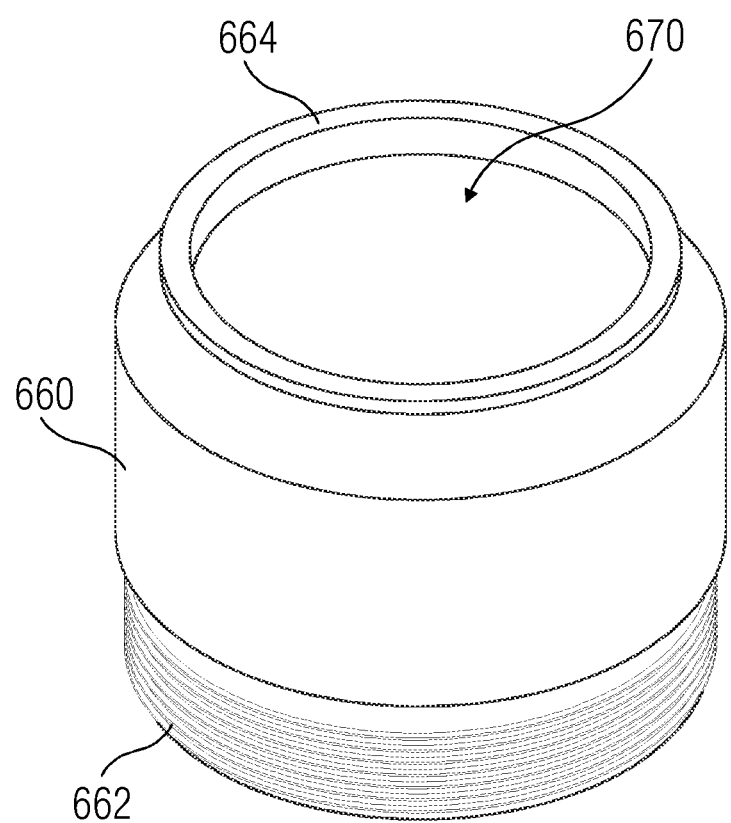

FIG. 40 illustrates a threaded adapter comprising male threads sized and configured to receive female threads of the extension tube shown in FIG. 14 and a non-threaded end configured to abut the machined end face of the non-threaded CRDM housing shown in FIGS. 38-39, according to at least one aspect of the present disclosure.

Figure 41:
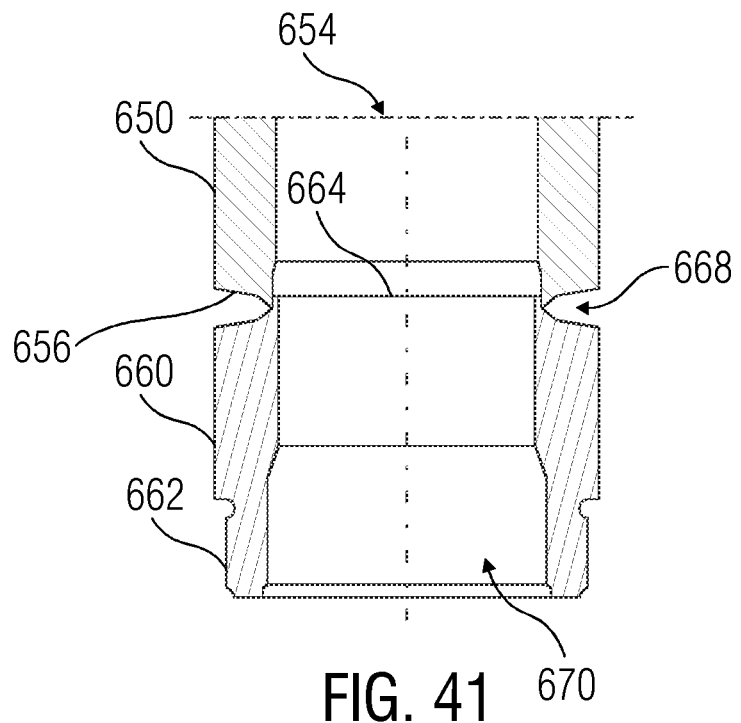

FIG. 41 illustrates a gap defined between the machined end face of the non-threaded CRDM housing and the non-threaded end of the threaded adapter shown in FIGS. 38-40, according to at least one aspect of the present disclosure.

Figure 42:
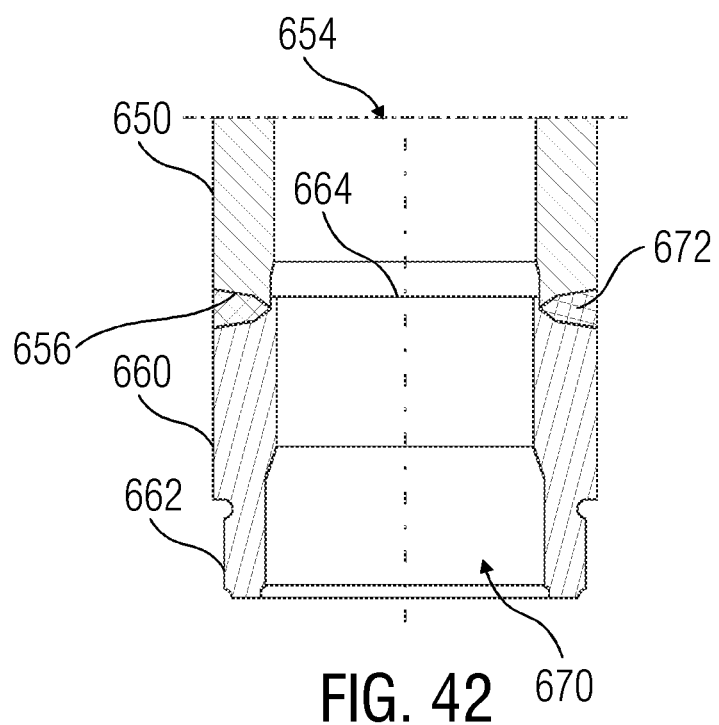

FIG. 42 illustrates the threaded adapter and the non-threaded CRDM housing shown in FIG. 41 in a joined configuration, according to at least one aspect of the present disclosure.

Figure 43:
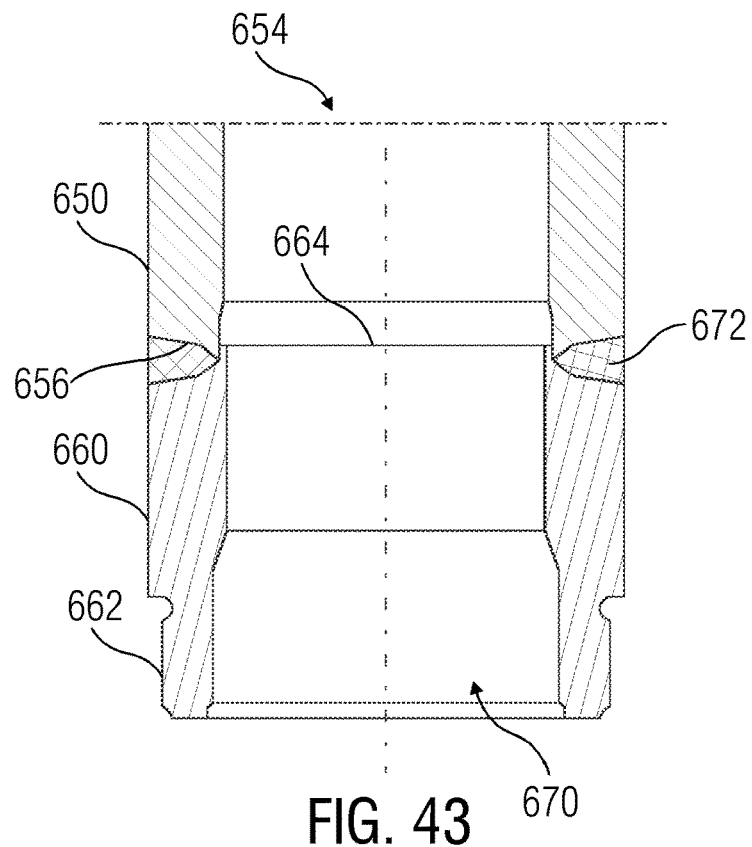

FIG. 43 illustrates machined bores defined by the non-threaded CRDM housing and the threaded adapter shown in FIG. 42, according to at least one aspect of the present disclosure.

Figure 44:
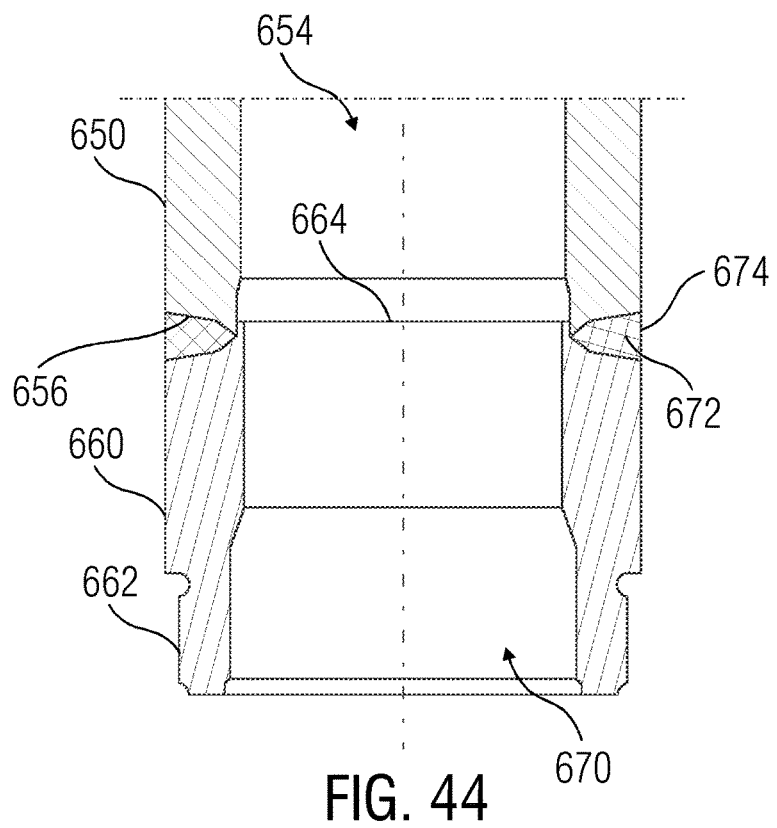

FIG. 44 illustrates a machined/ground OD of the joint shown in FIGS. 42-43, according to at least one aspect of the present disclosure.

Figure 45:
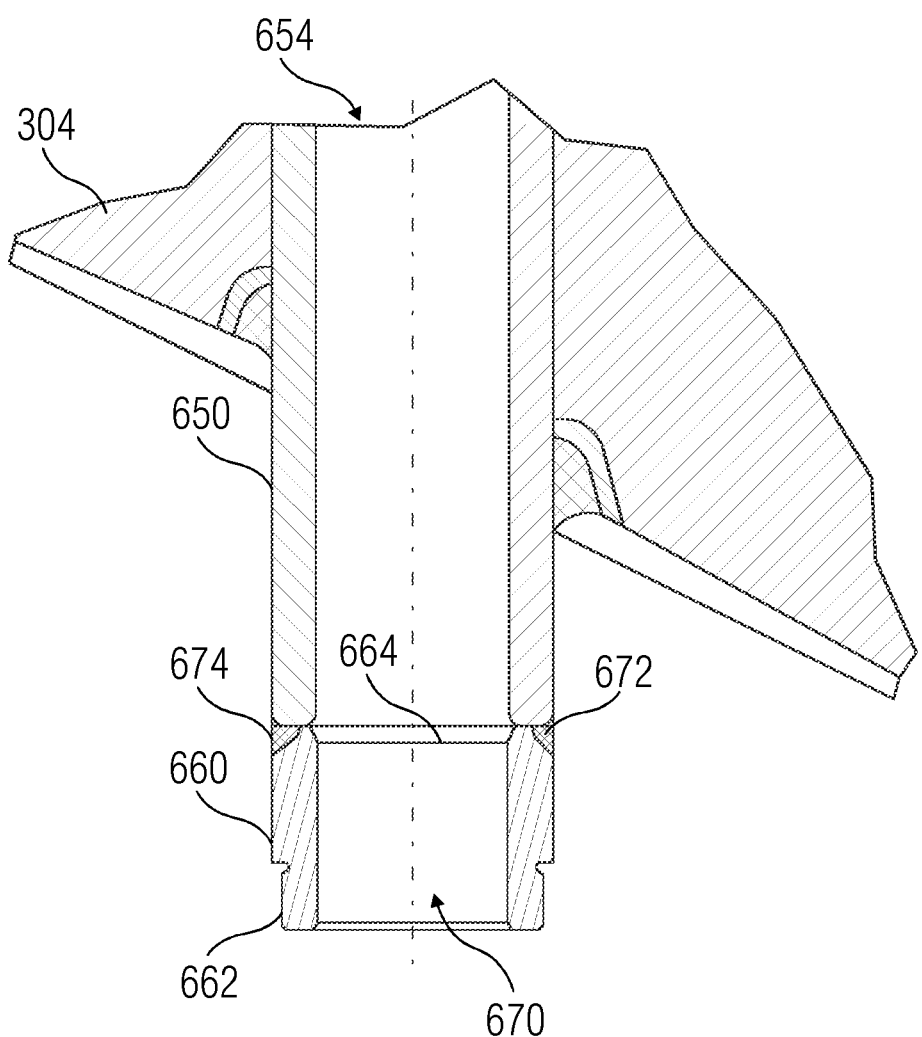

FIG. 45 illustrates the joined threaded adapter and non-threaded CRDM housing shown in FIGS. 38-44 installed below the reactor vessel head and ready to receive the extension tube, according to at least one aspect of the present disclosure.

Figure 46:
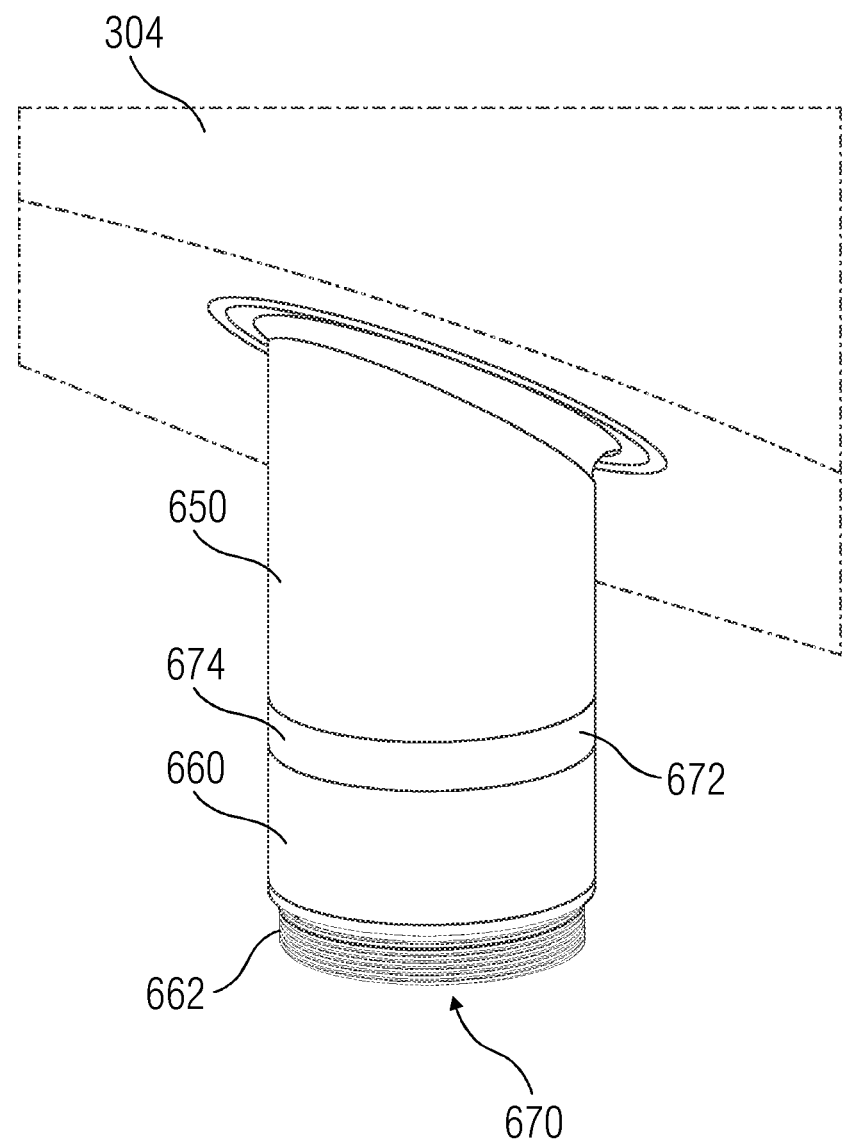
Figure 47:
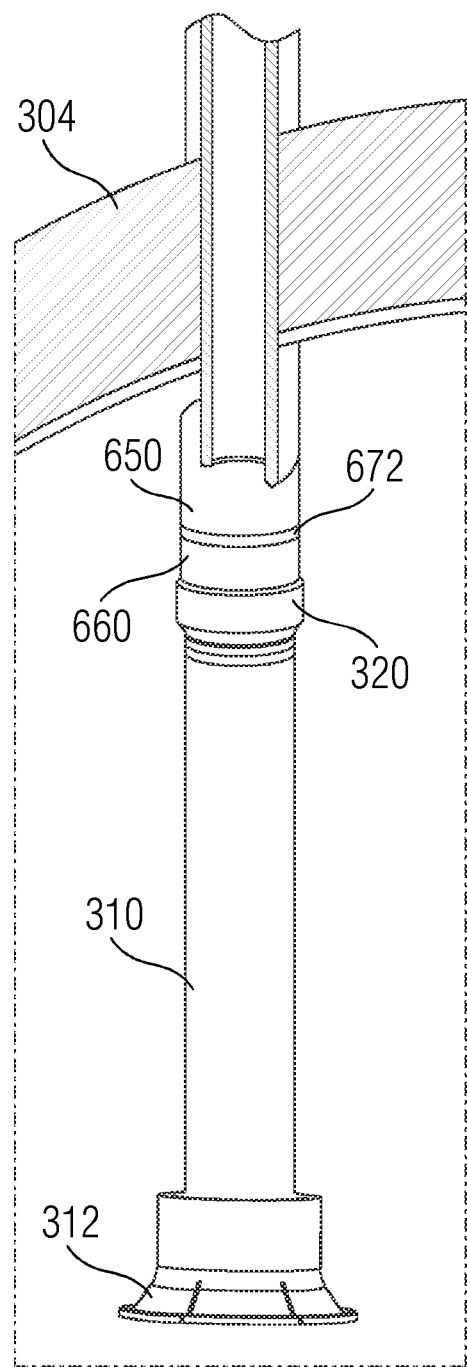

FIG. 46 illustrates the joined threaded adapter and non-threaded CRDM housing shown in FIGS. 38-45 installed below the reactor vessel head and ready to receive the extension tube, according to at least one aspect of the present disclosure FIG. 47 illustrates the threaded adapter of the extension tube installed on the threaded adapter attached to the non-threaded CRDM housing as shown in FIGS. 38-46 from below the reactor vessel head, according to at least one aspect of the present disclosure.

Figure 48:
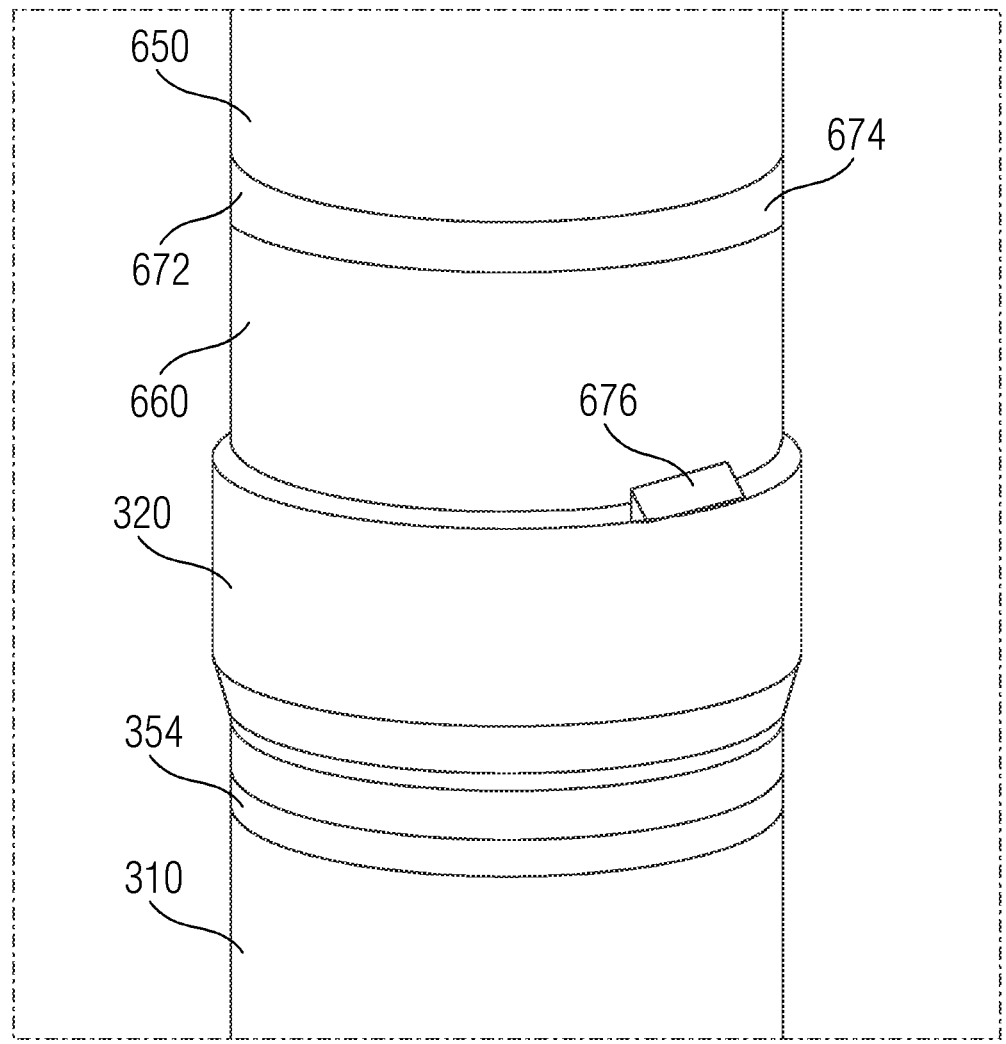

FIG. 48 illustrates retention fillet welds between the threaded adapter of the extension tube and the threaded adapter of the non-threaded CRDM housing shown in FIGS. 38-47, according to at least one aspect of the present disclosure.

DESCRIPTION

This application is related to PCT/US2020/019116, filed on Feb. 20, 2020, titled ANTI-ROTATION ARRANGEMENTS FOR THERMAL SLEEVES, which is herein incorporated by reference in its entirety.

Before explaining various aspects of methods for eliminating thermal sleeves in nuclear reactors, or more particularly, methods for replacing the thermal sleeves with extension tubes which attach directly to control rod drive mechanism (CRDM) penetration housings of the nuclear reactor in detail, it should be noted that the illustrative aspects are not limited in application or use to the details of construction and arrangement of parts illustrated in the accompanying drawings and description. The illustrative aspects may be implemented or incorporated in other aspects, variations and modifications, and may be practiced or carried out in various ways. Further, unless otherwise indicated, the terms and expressions utilized herein have been chosen for the purpose of describing the illustrative aspects for the convenience of the reader and are not for the purpose of limitation thereof.

Further, it is understood that any one or more of the following-described forms, expressions of forms, examples, can be combined with any one or more of the other following-described forms, expressions of forms, and examples.

In one aspect, the present disclosure is directed, as stated above, to methods for eliminating thermal sleeves in nuclear reactors. In another aspect, the present disclosure is directed to methods for replacing the thermal sleeves with extension tubes which attach directly to CRDM penetration housings of the nuclear reactor. In one aspect, the thermal sleeve can be removed from underneath the reactor vessel closure head (RVCH) using exiting equipment and processes for thermal sleeve removal. An extension tube, which attaches directly to the CRDM penetration housing, is installed. In accordance with one aspect, there are two main components required to eliminate a thermal sleeve. First is the extension tube and second is the upper guide sleeve. The purpose of the upper guide sleeve is to provide the final guidance for the drive rod into the CRDM through the latch stop plate.

Generally speaking, there are two styles of CRDM penetration housings—threaded and non-threaded. Threaded penetrations have a 3¾"-8 UN-2A thread. Non-threaded penetrations have a bare tubular end with radii on both the OD and ID to face transitions.

For threaded penetrations, an extension tube may be manufactured to a specific length which would set a funnel height at the same elevation as existing thermal sleeves when threaded on and tightened. For non-threaded penetrations, a penetration nozzle may be welded on to the penetration which would then provide the proper male thread for attaching the extension tube.

A special Compressible Guide Sleeve (CGS) has been designed to provide the same functions that the guide sleeve does on replacement RVCHs and AP1000 pressurized water reactors, for example. The CGS can be installed from underneath the RVCH, along with the extension tube. The present disclosure provides a new and innovative process of retrofitting an extension tube onto an in-service RVCH.

Thermal sleeves that exhibit flange and/or ID/OD wear are suitable candidates for elimination and replacement with extension tubes to eliminate recurring maintenance costs and failures which require costly repairs before a return to power is possible. Wear predictions through PWROG programs can be used to identify which thermal sleeves will need eventual intervention. Proactive elimination combined with engineering justification can eliminate or greatly delay future thermal sleeve inspections for a many types of wear.

Figure 1:
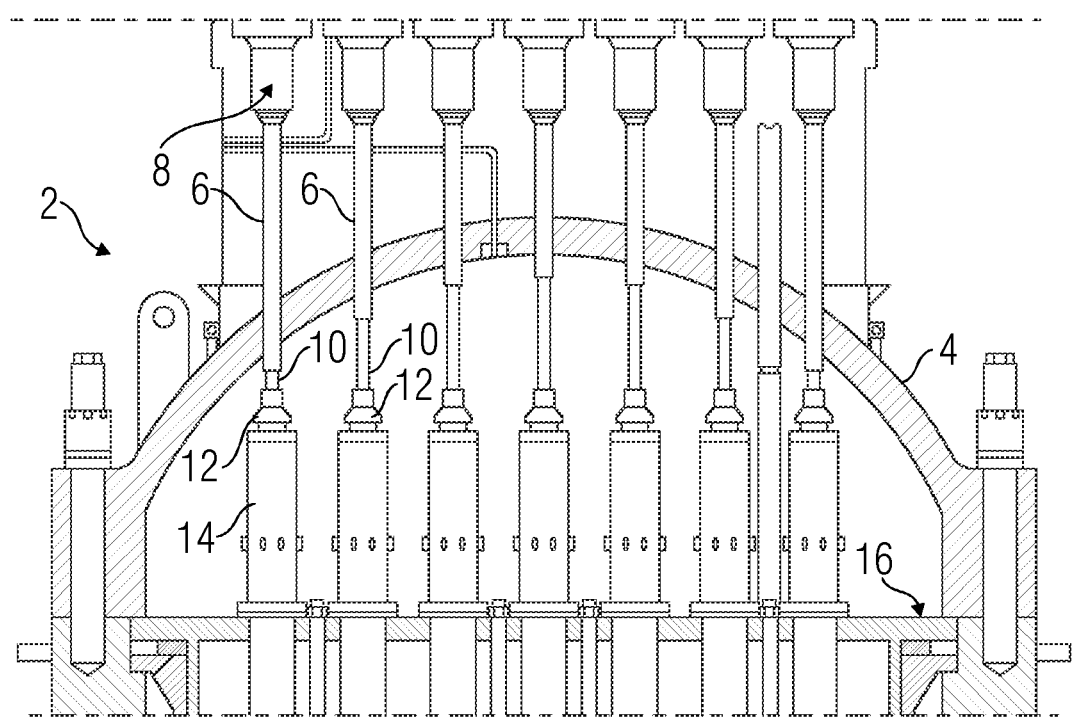
FIG. 1 is a schematic cross-sectional view of an upper portion of a conventional nuclear reactor, according to at least one aspect of the present disclosure.
Figure 2:
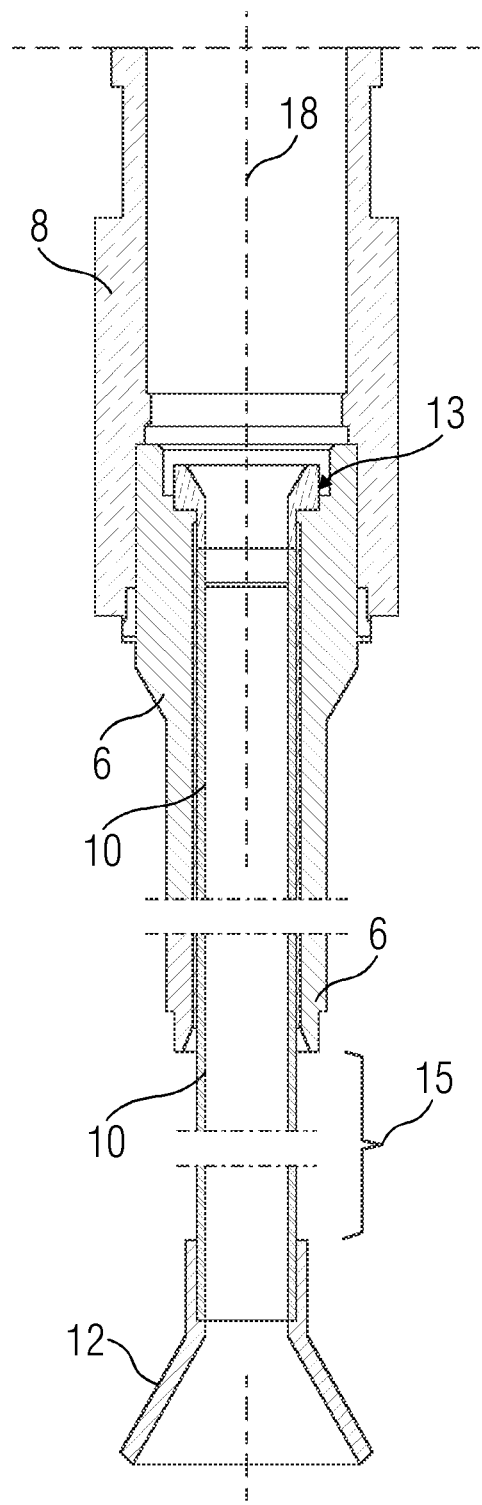
FIG. 2 is a schematic cross-sectional view of a conventional reactor vessel head penetration illustrating a CRDM housing, a head penetration nozzle, and a thermal sleeve, according to at least one aspect of the present disclosure.

FIG. 1 is a schematic cross-sectional view of an upper portion of a conventional nuclear reactor 2 illustrating a portion of a reactor vessel 4 penetrated by a plurality of head penetration nozzles 6 which extend downward from a CRDM housing 8. FIG. 2 is a schematic cross-sectional view of a conventional reactor vessel head penetration illustrating a CRDM housing 8, a head penetration nozzle 6, and a thermal sleeve 10. Continuing to refer to FIG. 1, as well as to the sectional view of FIG. 2, a thermal sleeve 10 including a guide funnel 12 is positioned within each head penetration nozzle 6 beneath each CRDM housing 8 such that each guide funnel 12 is positioned directly above, and spaced a distance from, a corresponding guide tube 14 extending from an upper support plate 16 within reactor vessel 4. The thermal sleeve 10 is housed within the head penetration nozzle 6 within the reactor vessel 4 except within region 15 (FIG. 2) where the thermal sleeve 10 is exposed to the reactor coolant.

The current belief is that wear of thermal sleeve 10 and head penetration nozzle 6 in region 13 illustrated in FIGS. 1 and 2 results from rotation of the thermal sleeve 10 within the head penetration nozzle 6 about a central axis 18 of the thermal sleeve 10. It is believed that vortices in the reactor coolant flowing within the reactor vessel 4 come into contact with the thermal sleeve 10 (i.e., in region 15) causing the thermal sleeve 10 to rotate about its central axis 18 relative to the head penetration nozzle 6.

The present disclosure provides methods for eliminating thermal sleeves 10 in a nuclear reactor 2 and, more particularly, methods for replacing thermal sleeves 10 in a nuclear reactor 2 with extension tubes attached directly to a CRDM penetration housing 6 of the nuclear reactor 2. These methods squarely fulfill the strong and repeated need for permanent thermal sleeve 10 replacement to remove the need for multiple, varied thermal sleeve 10 inspections over time.

FIG. 3 is a section view 100 of a thermal sleeve 110 and a CDRM housing 108 in an un-worn condition. The thermal sleeve 110 includes a flange 112 defines an outside diameter 114 (OD) and an inside diameter 116 (ID) that are subject to wear. The thermal sleeve 110 is subject to wear between the upper head and the CRDM penetration housing 108 in a nuclear reactor.

FIG. 4 is a section view 120 of the thermal sleeve 110 and the CDRM housing 108 in a substantially worn condition. As discussed above, the thermal sleeve 110 shows substantial wear at the flange 112 and the OD 114 and ID 116. This wear my be manifested by a drop of the thermal sleeve 110.

FIG. 5 is a section view 140 of the thermal sleeve 110 and the CDRM housing in a worn condition to the point of thermal sleeve 110 separation. As shown, the thermal sleeve 110 has developed a crack 118 resulting in the separation of the thermal sleeve 110. The section view 140 also shows additional wear of the flange 112, OD 114, and ID 116 relative to the section view 120 shown in FIG. 4.

With reference to FIGS. 1-5, extension tubes can be retrofitted in a variety of reactor vessel 4 (FIG. 1) heads which currently have thermal sleeves 10 (FIGS. 1-2), 110 (FIGS. 3-5) installed. Typical CRDM penetration designs have either "threaded" or "non-threaded" ends protruding through the reactor vessel 4 head. With reference also to FIG. 6, an extension tube 200 that can be installed in the nuclear reactor 4 in place of thermal sleeves 10, 110 is shown. The extension tube 200 comprises a substantially cylindrical body 202 and a threaded end 204 that would protrude through the reactor vessel 4 head once installed and threadably couple to threaded penetration nozzle. FIG. 7 illustrates an extension tube 240 that can be installed in the nuclear reactor 4 in place of thermal sleeves 10, 110. The extension tube 240 comprises a substantially cylindrical body 242 and a non-threaded end 244 that would protrude through the reactor vessel 4 head once installed and couple to a non-threaded penetration nozzle by a suitable weld, for example.

FIG. 8 is a schematic cross-sectional view of an upper portion of a conventional nuclear reactor 302 illustrating a portion of a reactor vessel head 304 penetrated by a plurality of head penetration nozzles 306 which extend downward from a CRDM housing 308. An extension tube 310 is coupled to the distal end 314 of the head penetration nozzle 306. The distal end 316 of the extension tube includes a guide funnel 312. The head penetration nozzles 306 include a compressible guide sleeve 318. A threaded penetration adapter 320 is coupled between the extension tube 310 and the head penetration nozzle 306. In one aspect, the threaded penetration adapter 320 is employed for non-threaded penetration nozzles 306 in order to facilitate the installation of the extension tube 310 on a non-threaded head penetration nozzle 306. The threaded penetration adapter 320 is welded to the end of the non-threaded head penetration nozzle 306. Compressible guide sleeves 318 are further described in commonly owned patent application number PCT/US2019/015797, filed Jan. 30, 2019, titled THERMAL SLEEVE, which is herein incorporated by reference in its entirety.

FIG. 9 is a section view of the threaded penetration adapter 320 coupled between the extension tube 310 and the head penetration nozzle 306. The threaded penetration adapter 320 includes a body 322 with an upper end adapted and configured to couple to the non-threaded end of the head penetration nozzle 306 and a lower end adapted and configured to couple to the extension tube 310. In one aspect, the upper end of the body 322 of the threaded penetration adapter 320 may be welded to the non-threaded head penetration nozzle 306 at connection 324 and the lower end of the threaded adapter body 322 may be welded to the extension tube 310 at connection 326. In one aspect, the connection 326 is a bimetallic weld in the extension tube 310 to transition to steel. In various aspects, the threaded penetration adapter 320 may include threads to threadably couple to the non-threaded head penetration nozzle 306 and/or the extension tube 310, for example.

FIG. 10 is a section view of a head penetration nozzle 306 with the extension tube 310. The head penetration nozzle 306 extends downward from a latch housing 336 and penetrates the reactor vessel head 304. The latch housing 336 contains a CRDM motor 330 and a compressible guide sleeve 332. The latch housing 336 is coupled to the head penetration nozzle 306 via a bimetallic weld 334. The head penetration nozzle 306 is coupled to an extension tube 310 within the reactor vessel head 304 through a threaded penetration adapter 320. The extension tube 310 is coupled to a guide funnel 312. As shown in FIG. 10, the thermal sleeve in the head penetration nozzle 306 has been replaced by the extension tube 310.

FIG. 11 is a section view of the head penetration nozzle 306 located through the reactor vessel head 304. The end of the head penetration nozzle outside the reactor vessel head 304 comprises a CRDM head adapter 337. The head penetration nozzle 306 defines a space 338, which normally contains a thermal sleeve that is notably missing.

FIG. 12 is a section view of the head penetration nozzle 306 with the extension tube 310. The head penetration nozzle 306 is coupled to the extension tube 310 via an optional threaded penetration adapter 320. The compressible guide sleeve 332, shown in detail in FIG. 14, is normally contained within a space 340 defined by the head penetration nozzle 306.

FIG. 13 is a perspective view of a compressible guide sleeve 332, which is received in the space 340 defined by the head penetration nozzle 306, as shown in FIG. 12. The compressible guide sleeve 332 comprises a three-leaf compressible flex section 342 for compressibility and stiffness. In various aspects, the compressible guide sleeve may comprise at least two and more than three compressible sleeves. Each of the leaf compressible flex sections 342 includes a flange 344 that is positioned within the CRDM housing 308. The compressible guide sleeve 332 is installed into the CRDM penetration to facilitate drive rod guidance into the latch housing 336 (FIG. 10). The bottom end of the compressible guide sleeve 332 comprises an alignment feature 346. Existing thermal sleeve elimination modifications in new RVCHs employ a smaller guide sleeve similar to a truncated thermal sleeve. The purpose of the guide sleeve is to provide guidance for the drive rod into the CRDM latch assembly. The compressible guide sleeve 332 accomplishes the same function as the guide sleeve and is installed from underneath the reactor vessel head 304 (FIGS. 8-12), after the extension tube 310 has been attached to the head penetration nozzle 306. While the design of the compressible guide sleeve 332 allows for it to be flexible enough to be installed through the CRDM penetration, it is also stiff/rigid enough that it requires a specialized fixture to compress the compressible guide sleeve 332 prior to installation. This stiffness is sufficient for it to remain in place during all of a nuclear plant's design basis conditions.

The entire extension tube 310 installation process occurs underneath the RVCH and requires no modifications or removals of the CRDM and requires no modifications to the upper internal components. Under-the-head installation processes are known and have been developed by the owner of the present application. The replacement of the thermal sleeve with the entire extension tube 310 eliminates all future thermal sleeve wear at the installation location. The extension tube 310 requires no inspections for wear throughout its life.

FIG. 14 illustrates an extension tube 310 with a guide funnel 312 and a threaded penetration adapter 320. In one aspect, the guide funnel 312 is collapsible and is configured to fail before CRDM or fuel damage can occur in the event of misalignment during head installation. In one aspect, the threaded penetration adapter 320 includes a threaded end with female threads 348 to threadably couple to male threads 349 (FIG. 17) of the head penetration nozzle 306 (FIGS. 8-13). During the thermal sleeve replacement process, retention fillet welds 352 are provided between the threaded penetration adapter 320 and the head penetration nozzle 306 to stabilize the connection. The threaded penetration adapter 320 is coupled to the extension tube 310 by a weld 354. The extension tube 310 is coupled to the guide funnel 312 by retention fillet welds 356.

FIG. 15 is a process 400 for removing a thermal sleeve in need of removal. The process 400 will now be described with reference to FIGS. 1-5 and 15. The thermal sleeve 10 (FIGS. 1-2), 110 (FIGS. 3-5) in need of removal is identified 402. The ID of the thermal sleeve 10, 110 is flapped and cleaned 404. The electrical discharging machining (EDM) head is installed 406 on one section of the thermal sleeve 10, 110 and the a series of cuts is performed. Once the series of cuts is completed, the thermal sleeve 10, 110 is removed 408 and the head penetration nozzle 306 is cleaned and inspected 410. The thermal sleeve 10, 110 removal is now complete 412.

FIG. 16 is a process 440 for installing a threaded extension tube. The process 400 will now be described with reference to FIGS. 1-5, 8-14, and 16. Once the thermal sleeve 10, 110 is removed 442 the threaded extension tube 310 is installed 444. The extension tube 310 is torqued 446 to the head penetration nozzle 306 using a torque tool. The alignment of the extension tube 310 is gauged 448. Retention fillet welds 352 are installed 450. A compressible guide sleeve 332 is installed 452 and the alignment of the extension tube 310 is finally gauged 454. The installation is now complete and the extension tube 310 is in its final installed arrangement 456. Details of the extension tube installation process 440 will now be described in more detail.

Still with reference to FIG. 16, FIGS. 17 and 18 illustrate the process step of installing 444 the threaded extension tube 310. As shown in FIG. 17, the extension tube 310 comprising a threaded penetration adapter 320 is aligned with a threaded head penetration nozzle 306 extending through the reactor vessel head 304. The threaded head penetration nozzle 306 comprises a threaded end 307 with male threads 349 configured to threadably couple the female threads 348 of the threaded end of the threaded penetration adapter 320. As previously discussed, the threaded penetration adapter 320 is coupled to the extension tube 310 by a weld 354. As shown in FIG. 18, the female threads 348 of the threaded end of the threaded penetration adapter 320 is threadably coupled to the male threads 349 of the threaded end 307 of the threaded penetration adapter 320.

Still with reference to FIGS. 16-18, FIGS. 19 and 20 illustrate torqueing 446 the extension tube 310 to the head penetration nozzle 306 using a torque tool 350.

Still with reference to FIGS. 16-20, FIGS. 21-23 illustrates the process of gauging 448 the extension tube 310 alignment after it has been properly torqued 446 to the head penetration nozzle 306, where FIG. 21 is a section view 520 of an extension tube 310 alignment gauging test, FIG. 22 is a perspective view of a gauge 522 used in the gauging 448 process, and FIG. 23 is a section view of the alignment of a drive rod 530 relative to the extension tube 310. The gauge 522 is inserted into the guide funnel 312, through the extension tube 310, the head penetration nozzle 306, and into the CRDM housing 308. The gauge 522 is rotated to fit into the guide funnel 312. The alignment of the extension tube 310 is measured relative to a nominal centerline with a maximum offset permitted from the nominal centerline. Datum A is measured at a point along the extension tube 310 and at a first radial offset 524 extending radially from the gauge 522 located at the end of the extension tube 310 near the guide tube 312, a second radial offset 526 located within the head penetration nozzle 306 just outside the reactor vessel head 304, and a third radial offset 528 located inside the CRDM housing 308. The amount of shift relative to datum A is determined at each radial offset 524, 256, 528 location. In FIG. 23, the alignment of a drive rod 532 is shown relative to the inlet of the guide funnel 312.

Once the gauging 448 of the extension tube 310 alignment, the retention fillet welds 352 are installed 450. Still with reference to FIGS. 16-23, FIG. 24 illustrates the retention fillet welds 352 installed 450 between the threaded end 307 of the head penetration nozzle 306 and the threaded penetration adapter 320 coupled to the extension tube 310 by a weld 354.

Following the installation 450 of the retention fillet welds 352, the compressible guide sleeve 332 is installed 452. Still with reference to FIGS. 16-24, FIGS. 25-29 illustrate the process of installing 452 the compressible guide sleeve 332. As shown in FIG. 25, the three-leaf compressible flex sections 342 of the compressible guide sleeve 332 are compressed to contract the flanges 344 of the compressible flex sections 342 to a size suitable for introducing into the guide funnel 312. FIG. 26 illustrates a compression tool 534 that may be employed to compress the compressible guide sleeve 332 prior to inserting the compressible guide sleeve 332 into the guide nozzle 312. FIG. 27 illustrates the compressible guide sleeve 332 in its compressed configuration inserted through the head penetration nozzle 306 and the CRDM head adapter 337 such that the flanges 344 of the compressible flex sections 342 are positioned just above a counterbore ledge 536 defined within the CRDM head adapter 337 section of the head penetration nozzle 306. In FIG. 28 the compressible flex sections 342 of the compressible guide sleeve 332 are released such that the flanges 344 of the compressible flex sections 342 engage the counterbore ledge 536 defined within the CRDM head adapter 337 section of the head penetration nozzle 306. The counterbore ledge 536 retains the compressible guide sleeve 332 within the CRDM head adapter 337 section of the head penetration nozzle 306. FIG. 29 illustrates the compressible guide sleeve 332 in its final installed state. A final gauging 454 of the extension tube 310 can now be performed.

Still with reference to FIGS. 16-29, FIGS. 30-33 illustrate the final installed arrangement 456 of the extension tube 310. FIG. 30 is a section view of the reactor vessel head 304 illustrating the extension tube 310 coupled to the head penetration nozzle 306 installed inside the reactor vessel head 304. FIG. 31 is a detailed view of the installed extension tube 310 coupled to the head penetration nozzle 306 showing the extension tube retention welds 352. FIG. 32 is a section view of the extension tube 310 coupled to the head penetration nozzle 306 installed inside the reactor vessel head 304. FIG. 33 is an elevation view of the extension tube 310 coupled to the head penetration nozzle 306 installed inside the reactor vessel head 304.

FIG. 34 illustrates a head penetration nozzle 306 with threads 552 that are not usable, due to wear, damage, or sizing mismatch. FIG. 35 is a section view of the head penetration 306 nozzle shown in FIG. 34. With reference now to FIGS. 17, 34, and 35, if the male threads 349 on the threaded end 307 of the CRDM head penetration nozzle 306 are not usable, due to wear, damage, or sizing mismatch, in one aspect, a threaded adapter 550 may be employed as a contingency. The threaded adapter 550 is welded 554 below the male threads 349 of the head penetration nozzle 310. The threaded adapter 550 includes male threads 552 suitable for threadably coupling the female thread 348 on the threaded adapter 320 of the extension tube 310.

The installation of an extension tube 310 in the field becomes more complicated at nuclear plants without CRDM housings comprising threaded head penetration nozzles 306. Additional field machining would be required to prepare the non-threaded CRDM housing for welding, as well as perform post-welding cleanup. Design of the extension tube 310 remains common between threaded and non-threaded CRDM housings. A process for installing an extension tube 310 on a non-threaded CRDM housing is described hereinbelow.

FIG. 36 is a process 600 for installing an extension tube on a non-threaded CRDM housings. With reference also to FIGS. 37-39, the process 600 begins by machining 602 a non-threaded CRDM housing 650. In other words, the CRDM housing 650 does not include a threaded head penetration nozzle with a threaded end 307 with male threads 349 as described with reference to FIGS. 3-35. FIG. 37 is a section view of a non-threaded CRDM housing 650 before machining. The machining 602 step involves preparing the face 652 (FIG. 37, pre-machining) of the non-threaded CRDM housing 650 geometry for machine welding and turning-back the ID bore 654 of the non-threaded CRDM housing 650. FIG. 38 is a section view of the non-threaded CRDM housing 650 after machining 602. FIG. 39 is a detail view of the section view of the non-threaded CRDM housing shown in FIG. 38. As shown in FIGS. 38 and 39, the face 656 (post-machining) of the non-threaded CRDM housing 650 is machined back to remove the radii and install the prep weld. FIG. 39 shows a detailed view of the machined face 656 of the non-threaded CRDM housing 650.

FIG. 41 illustrates a gap 668 defined between the machined end face 656 of the non-threaded CRDM housing 650 and the non-threaded end 654 of the threaded adapter 660. With continued reference to FIGS. 36-39 and with reference also to FIGS. 14 and 40-41, the next step in the process 600 is installing and aligning 604 a threaded adapter 660 to the machined non-threaded CRDM housing 650. As shown in FIG. 40, the threaded adapter 660 comprises male threads 662 sized and configured to receive the female threads 348 of the extension tube 310 (See FIG. 14, for example) and a non-threaded end 664 configured to abut the machined end face 656 of the non-threaded CRDM housing 650. The threaded adapter 660 also defines a bore 670. As shown in FIG. 41, a gap 668 is defined between the machined end face 656 of the non-threaded CRDM housing 650 and the non-threaded end of the threaded adapter 660.

FIG. 42 illustrates the threaded adapter 660 joined to the non-threaded CRDM housing 650. With continued reference to FIGS. 36-41, and with reference also to FIG. 42, the next step in the process 600 is joining 606 the threaded adapter 660 to the non-threaded CRDM housing 650. In one aspect, the threaded adapter 660 is joined 606 to the CRDM housing by the a penetration welding technique to form a joint 672. In one aspect, the threaded adapter 660 may be joined 606 to the non-threaded CRDM housing 650 by a full penetration weld that joins 606 the threaded adapter 660 to the non-threaded CRDM housing 650 with no gaps in between the filler material and the roots of the joint 672. In one aspect, the threaded adapter 660 may be welded to the non-threaded CRDM housing 650 may be performed using a specialized semi-automatic gas tungsten arc welding (GTAW) weld head, for example.

FIG. 43 illustrates machined bores 654, 670 defined by the non-threaded CRDM housing and the threaded adapter. With continued reference to FIGS. 36-42, and with reference also to FIG. 43, the next step in the process 600 is machining 608 the bore 670 defined by the threaded adapter 660 and/or the bore 654 defined by the non-threaded CRDM housing 650. This step removes an integral backing ring/alignment ring.

FIG. 44 illustrates a machined/ground OD 674 of the joint 672. With continued reference to FIGS. 36-43, and with reference also to FIG. 44, the next step in the process 600 is machining/grinding 610 the OD 674 of the joint 672, such as the penetration weld cap, for inspections. FIGS. 45 and 46 show the threaded adapter 660 attached to the non-threaded CRDM housing 650 installed below the reactor vessel head 304 and ready to receive the extension tube 310.

FIG. 47 illustrates the threaded adapter 320 of the extension tube 310 installed on the threaded adapter attached to the non-threaded CRDM housing from below the reactor vessel head 304. With continued reference to FIGS. 36-46, and with reference also to FIGS. 14 and 47, the next step in the process 600 is installing the threaded adapter 320 of the extension tube 310 on the threaded adapter 660 attached to the non-threaded CRDM housing from below the reactor vessel head 304. This step includes threading and torqueing the extension tube 310 on the threaded adapter 660 in manner similar to that described above with reference to 17-20.

FIG. 48 illustrates retention fillet welds 676 between the threaded adapter 320 of the extension tube 310 and the threaded adapter 660 of the non-threaded CRDM housing 650. With continued reference to FIGS. 36-47, and with reference also to FIGS. 14 and 48, the next step in the process 600 is installing 614 retention fillet welds 676. The process 600 may comprise installing a guide funnel 312 as described above with reference to 8-14, for example. The process 600 may further comprise gauging the alignment of the extension tube using the same process described above with reference to FIGS. 21-23, for example. The process 600 may further comprise installing a compressible guide sleeve 332 using the same process described above with reference to FIGS. 25-29, for example.

Although certain aspects have been illustrated and described herein for purposes of description, a wide variety of alternate and/or equivalent aspects or implementations calculated to achieve the same purposes may be substituted for the aspects shown and described without departing from the scope of the present disclosure. This application is intended to cover any adaptations or variations of the embodiments discussed herein.

Examples of the methods and/or systems of various aspects of the present disclosure are provided below. An aspect of the methods and/or systems may include any one or more than one, and any combination of, the examples described below.

Example 1—A method for installing an extension tube in a nuclear reactor comprising a control rod drive mechanism (CRDM) housing with a threaded head penetration nozzle and a thermal sleeve disposed therein. The method comprises removing the thermal sleeve from the threaded head penetration nozzle and aligning an extension tube with the threaded end of the head penetration nozzle. The extension tube comprises a threaded end and non-threaded end, the threaded end sized and configured to threadably couple to the threaded head penetration nozzle. The method further comprises threading the threaded end of the extension tube to the threaded end of the threaded head penetration nozzle, torqueing the extension tube to the threaded end of the threaded head penetration nozzle, gauging the alignment of the extension tube relative to the threaded head penetration nozzle, installing retention fillet welds between the extension tube and the threaded end of the threaded head penetration nozzle, and installing a guide funnel to the non-threaded end of the extension tube.

Example 2—The method of Example 1, comprising installing a compressible guide sleeve to the CRDM housing.

Example 3—The method of Example 2, wherein installing the compressible guide sleeve to the CRDM housing comprises compressing the compressible guide sleeve, and inserting the compressed guide sleeve into the guide funnel, through the extension tube, the head penetration nozzle, and the CRDM housing. Installing the compressible guide sleeve to the CRDM housing further comprises releasing the compression of the compressible guide sleeve to retainably couple to the CRDM housing.

Example 4—The method of any one of Examples 2-3, wherein the compressible guide sleeve comprises a multiple leaf compressible flex sections, wherein each of the multiple leaf compressible flex sections comprises a flange. The method comprises compressing the multiple leaf compressible flex sections to contract the flanges prior to inserting the compressed guide sleeve into the guide funnel, and releasing the compression of the compressible guide sleeve after insertion into the CRDM housing to release the flanges to engage a counterbore ledge defined by the CRDM housing.

Example 5—The method of any one of Examples 1-4, comprising performing a final gauging of the alignment of the extension tube.

Example 6—The method of any one of Examples 2-5, wherein the compressible guide sleeve is inserted into the guide funnel from a position below the reactor vessel head.

Example 7—The method of any one of Examples 1-6, wherein the extension tube is installed from a position below the reactor vessel head.

Example 8—The method of any one of Examples 1-7, wherein prior to aligning the extension tube with the threaded end of the head penetration nozzle and threading the threaded end of the extension tube to the threaded end of the threaded head penetration nozzle, the method comprises joining a threaded adapter to the threaded end of the threaded head penetration nozzle, wherein the threaded adapter comprises male threads sized and configured to threadably couple to the threaded end of the extension tube.

Example 9—A method for installing an extension tube in a nuclear reactor comprising a control rod drive mechanism (CRDM) housing with a non-threaded head penetration nozzle and a thermal sleeve disposed therein. The method comprises machining the non-threaded CRDM housing, installing and aligning a threaded adapter to the machined end of the non-threaded CRDM housing, joining the threaded adapter to the machined end of the non-threaded CRDM housing, machining a bore defined by the non-threaded CRDM housing, machining a bore defined by the threaded adapter, machining an outside diameter of the joint between the machined end of the non-threaded CRDM housing and the threaded adapter, installing an extension tube to the threaded adapter, and installing retention fillets welds between the extension tube and the threaded adapter.

Example 10—The method of Example 9, wherein machining the non-threaded CRDM housing comprises preparing a face of the non-threaded CRDM housing, and turning-back an inside diameter of the bore defined by the non-threaded CRDM housing.

Example 11—The method of any one of Examples 9-10, wherein joining the threaded adapter to the machined end of the non-threaded CRDM housing comprises performing a penetration welding technique to form the joint.

Example 12—The method of any one of Examples 9-11, wherein joining the threaded adapter to the machined end of the non-threaded CRDM housing comprises performing a full penetration welding technique to form the joint.

Example 13—The method of any one of Examples 9-12, wherein installing an extension tube to the threaded adapter comprises threading the extension tube on the threaded adapter, and torqueing the extension tube on the threaded adapter.

Example 14—The method of any one of Examples 9-13, comprising gauging the alignment of the extension tube relative to the threaded head penetration nozzle.

Example 15—The method of any one of Examples 9-14, comprising installing a guide funnel to the non-threaded end of the extension tube.

Example 16. The method of any one of Examples 9-15, comprising installing a compressible guide sleeve to the non-threaded CRDM housing.

Example 17—The method of Example 16, wherein installing the compressible guide sleeve to the non-threaded CRDM housing comprises compressing the compressible guide sleeve, and inserting the compressed guide sleeve through the extension tube, the head penetration nozzle, and the non-threaded CRDM housing. Installing the compressible guide sleeve to the non-threaded CRDM housing further comprises releasing the compression of the compressible guide sleeve to retainably couple to the non-threaded CRDM housing.

Example 18—The method of any one of Examples 16-17, wherein the compressible guide sleeve comprises a multiple leaf compressible flex sections, wherein each of the multiple leaf compressible flex sections comprises a flange. The method comprises compressing the multiple leaf compressible flex sections to contract the flanges prior to inserting the compressed guide sleeve into the extension tube, and releasing the compression of the compressible guide sleeve after insertion into the non-threaded CRDM housing to release the flanges to engage a counterbore ledge defined by the non-threaded CRDM housing.

Example 19—The method of any one of Examples 9-18, comprising performing a final gauging of the alignment of the extension tube.

Example 20—The method of any one of Examples 16-19, wherein the compressible guide sleeve is inserted into the guide funnel from a position below the reactor vessel head.

Example 21—The method of any one of Examples 9-20, wherein the extension tube is installed from a position below the reactor vessel head.

The invention claimed is:

1. A method for installing an extension tube in a nuclear reactor comprising a control rod drive mechanism (CRDM) housing with a threaded head penetration nozzle and a thermal sleeve disposed therein, the method comprising:
   removing the thermal sleeve from the threaded head penetration nozzle;
   installing the extension tube in lieu of a replacement thermal sleeve, wherein the installing comprises:
      aligning the extension tube with a threaded end of the threaded head penetration nozzle, the extension tube comprising a threaded end and non-threaded end, the threaded end sized and configured to threadably couple to the threaded head penetration nozzle;
      threading the threaded end of the extension tube to the threaded end of the threaded head penetration nozzle;
      torqueing the extension tube to the threaded end of the threaded head penetration nozzle;
      gauging the alignment of the extension tube relative to the threaded head penetration nozzle; and
      installing retention fillet welds between the extension tube and the threaded end of the threaded head penetration nozzle; and
      installing a guide funnel to the non-threaded end of the extension tube.

2. The method of claim 1, comprising installing a compressible guide sleeve to the CRDM housing.

3. The method of claim 2, wherein installing the compressible guide sleeve to the CRDM housing comprises:
   compressing the compressible guide sleeve;
   inserting the compressed guide sleeve into the guide funnel, through the extension tube, the threaded head penetration nozzle, and the CRDM housing; and
   releasing the compression of the compressible guide sleeve to retainably couple the compressible guide sleeve to the CRDM housing.

4. The method of claim 3, wherein the compressible guide sleeve comprises multiple leaf compressible flex sections, wherein each of the multiple leaf compressible flex sections comprises a flange, the method comprising:
   compressing the multiple leaf compressible flex sections to contract the flanges prior to inserting the compressed guide sleeve into the guide funnel; and
   releasing the compression of the compressible guide sleeve after insertion into the CRDM housing to release the flanges to engage a counterbore ledge defined by the CRDM housing.

5. The method of claim 4, comprising performing a gauging of an alignment of the extension tube.

6. The method of claim 3, wherein the compressible guide sleeve is inserted into the guide funnel from a position below a reactor vessel head of the nuclear reactor.

7. The method of claim 1, wherein the extension tube is installed from a position below a reactor vessel head of the nuclear reactor.

8. The method of claim 1, wherein the extension tube comprises a threaded adapter comprising the threaded end of the extension tube.

9. A method for installing an extension tube in a nuclear reactor comprising a control rod drive mechanism (CRDM) housing with a threaded head penetration nozzle and a thermal sleeve disposed therein, the method comprising:
   removing the thermal sleeve from the threaded head penetration nozzle; and
   replacing the removed thermal sleeve with an extension tube, wherein the replacing comprises coupling the extension tube to the threaded head penetration nozzle.

10. The method of claim 9, wherein coupling the extension tube to the threaded head penetration nozzle comprises:
   aligning a threaded end of the extension tube to the threaded head penetration nozzle; and
   torqueing the extension tube to the threaded end of the threaded head penetration nozzle.

11. The method of claim 10, further comprising coupling a guide funnel to the extension tube.

12. The method of claim 11, wherein coupling the guide funnel to the extension tube comprises coupling the guide funnel to a non-threaded end of the extension tube.

13. The method of claim 11, further comprising installing a compressible guide sleeve to the CRDM housing.

14. The method of claim 13, wherein installing the compressible guide sleeve to the CRDM housing comprises:
   compressing the compressible guide sleeve;
   inserting the compressed guide sleeve into the guide funnel, through the extension tube, the threaded head penetration nozzle, and the CRDM housing; and
   releasing the compression of the compressible guide sleeve to retainably couple the compressible guide sleeve to the CRDM housing.

15. The method of claim 14, wherein the compressible guide sleeve comprises multiple leaf compressible flex sections, wherein each of the multiple leaf compressible flex sections comprises a flange, wherein the method further comprises:
  compressing the multiple leaf compressible flex sections to contract the flanges prior to inserting the compressed guide sleeve into the guide funnel; and
  releasing the compression of the compressible guide sleeve after insertion into the CRDM housing to release the flanges to engage a counterbore ledge defined by the CRDM housing.

16. The method of claim 9, further comprising installing retention fillet welds between the extension tube and a threaded end of the threaded head penetration nozzle.

17. The method of claim 9, wherein the extension tube is installed from a position below a reactor vessel head of the nuclear reactor.

18. The method of claim 9, wherein the extension tube comprises a threaded adapter, and wherein coupling the extension tube to the threaded head penetration nozzle comprises coupling the threaded adapter to the threaded head penetration nozzle.

19. A method for installing an extension tube in a nuclear reactor comprising a control rod drive mechanism (CRDM) housing with a threaded head penetration nozzle and a thermal sleeve disposed therein, the method comprising:
  removing the thermal sleeve from the threaded head penetration nozzle; and
  replacing the removed thermal sleeve with an extension tube and a threaded adapter, wherein the replacing comprises:
    coupling a first threaded end of the threaded adapter to the extension tube; and
    coupling a second threaded end of the threaded adapter to the threaded head penetration nozzle.

20. The method of claim 19, further comprising coupling a guide funnel to the extension tube.

* * * * *